(12) United States Patent
Sung et al.

(10) Patent No.: US 11,513,629 B2
(45) Date of Patent: Nov. 29, 2022

(54) DISPLAY DEVICE

(71) Applicant: SAMSUNG DISPLAY CO., LTD., Yongin-si (KR)

(72) Inventors: Seung Jae Sung, Hwaseong-si (KR); Young Chan Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/492,764

(22) Filed: Oct. 4, 2021

(65) Prior Publication Data
US 2022/0187972 A1 Jun. 16, 2022

(30) Foreign Application Priority Data
Dec. 14, 2020 (KR) .......................... 10-2020-0174490

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 3/04182* (2019.05)

(58) Field of Classification Search
CPC ............... G06F 3/04164; G06F 3/0412; G06F 3/041–047; G06F 2203/041–04114; H01L 27/323; H01L 27/32–3293
See application file for complete search history.

(56) References Cited

FOREIGN PATENT DOCUMENTS

| JP | 5354545 | 9/2013 |
|---|---|---|
| KR | 10-1931737 | 12/2018 |
| KR | 10-2030635 | 10/2019 |
| KR | 10-2020-0078136 | 7/2020 |

*Primary Examiner* — Sanjiv D. Patel
(74) *Attorney, Agent, or Firm* — F. Chau & Associates, LLC

(57) ABSTRACT

A display device includes a plurality of pixels. A gate line extends in a first direction and is connected to each of the plurality of pixels. A common electrode is disposed above the gate line and extends across the plurality of pixels. A touch sensing unit is disposed above the common electrode and includes a plurality of driving electrodes and a plurality of sensing electrodes. A display driver drives the plurality of pixels. A first fan-out line is connected to the display driver. A touch driver drives the driving electrodes and the sensing electrodes. A second fan-out line is connected to the touch driver. A first switching element selectively connects one of the first fan-out line and the second fan-out line to the gate line.

21 Claims, 20 Drawing Sheets

DU: SUB, TFTL, EML, TFEL

DISPLAY DEVICE

This application claims priority under 35 U.S.C. § 119 to Korean Patent Application No. 10-2020-0174490, filed on Dec. 14, 2020 in the Korean Intellectual Property Office, the disclosure of which is incorporated by reference in its entirety herein.

1. TECHNICAL FIELD

The present inventive concepts relate to a display device.

2. DISCUSSION OF RELATED ART

As the information-oriented society evolves, the usage of display devices is increasing. For example, display devices are being applied to a variety of electronic devices such as smart phones, digital cameras, laptop computers, navigation devices, and smart televisions. Display devices include flat panel display devices such as a liquid-crystal display device, a field emission display device, and an organic light-emitting display device. Among such flat panel display devices, a light-emitting display device includes a light-emitting element that emits light on its own. Accordingly, a light-emitting display device can display images without a backlight unit for supplying light to the display panel.

Recently, a touch sensing unit that recognizes a touch input has been widely employed as an input means of an electronic product that includes a display device, such as a smartphone or a tablet PC. The touch sensing unit determines whether a users touch input is received, and calculates the coordinates of the position of a touch input. When a display unit and a touch sensing unit are driven simultaneously, images may be distorted and thus image quality and touch sensitivity may deteriorate due to coupling capacitance between the display unit and the touch sensing unit.

SUMMARY

Aspects of the present inventive concepts provide a display device that can check the degradation degree of the film quality at different positions that may possibly block electric signals between a display unit and a touch sensing and can quantify the degradation degree of the film quality.

It should be noted that aspects of the present inventive concepts are not limited to the above-mentioned aspects; and other aspects of the present inventive concepts will be apparent to those skilled in the art from the following descriptions.

According to an embodiment of the present inventive concepts, a display device includes a plurality of pixels. A gate line extends in a first direction and is connected to each of the plurality of pixels. A common electrode is disposed above the gate line and extends across the plurality of pixels. A touch sensing unit is disposed above the common electrode and includes a plurality of driving electrodes and a plurality of sensing electrodes. A display driver is configured to drive the plurality of pixels. A first fan-out line is connected to the display driver. A touch driver is configured to drive the plurality of driving electrodes and the plurality of sensing electrodes. A second fan-out line is connected to the touch driver. A first switching element is configured to selectively connect one of the first fan-out line and the second fan-out line to the gate line.

In an embodiment, the common electrode may receive a low-level voltage if the first fan-out line is connected to the gate line, and the common electrode may be grounded to a certain voltage or earth if the second fan-out line is connected to the gate line.

In an embodiment, the display device may further comprise a driving voltage line disposed above the gate line, extended in a second direction crossing the first direction, and connected to the plurality of pixels. The driving voltage line may receive a driving voltage if the first fan-out line is connected to the gate line, and the driving voltage line may be grounded to a certain voltage or earth if the second fan-out line is connected to the gate line.

In an embodiment, the display device may further comprise: a data line extended in a second direction crossing the first direction and connected to the plurality of pixels, and a second switching element configured to selectively connect one of the first fan-out line and the second fan-out line to the data line.

In an embodiment, the display device may further comprise a driving voltage line disposed above the data line, extended in the second direction, and connected to the plurality of pixels. The driving voltage line may receive a driving voltage if the first fan-out line is connected to the data line, and the driving voltage line may be grounded to a certain voltage or earth if the second fan-out line is connected to the data line.

In an embodiment, the touch sensing unit further comprises a plurality of driving lines connected to the plurality of driving electrodes, and a plurality of sensing lines connected to the plurality of sensing electrodes. The display device may further comprise: first touch pads connecting the plurality of driving lines with the touch driver, second touch pads connecting the plurality of sensing lines with the touch driver, and third touch pads connecting the second fan-out line with the touch driver.

In an embodiment, the display driver may supply a gate signal to the gate line through the first fan-out line in a first mode. The touch driver may supply a touch driving signal to the plurality of driving electrodes in the first mode to receive a touch sensing signal from the plurality of sensing electrodes.

In an embodiment, the touch driver may supply a touch driving signal to the gate line through the second fan-out line in a second mode to receive a touch sensing signal from the plurality of sensing electrodes.

In an embodiment, the display driver may supply a source signal to the gate line through the first fan-out line in a third mode. The touch driver may supply a touch driving signal to the plurality of driving electrodes in the third mode to receive a touch sensing signal from the plurality of sensing electrodes.

In an embodiment, the source signal may be at least one of a sine wave signal, a square wave signal, a pulse signal, a ramp wave signal, and a Gaussian noise signal.

In an embodiment, the touch sensing unit may further comprise a noise sensing line extended along borders of the plurality of driving electrodes and the plurality of sensing electrodes.

In an embodiment, the touch driver may supply a touch driving signal to the gate line through the second fan-out line in a second mode to receive a touch sensing signal from the noise sensing line.

In an embodiment, the display device may further comprise a control unit configured to supply a mode control signal to the first switching element to connect the first switching element with one of the first fan-out line and the second fan-out line.

In an embodiment, the control unit may receive a capacitance between the gate line and the sensing electrode from the touch driver in the second mode and may generate noise compensation data based on the capacitance.

According to an embodiment of the present inventive concepts, a display device includes a plurality of pixels. A gate line extends in a first direction and is connected to each of the plurality of pixels. A common electrode is disposed above the gate line and extends across the plurality of pixels. A touch sensing unit is disposed above the common electrode and includes a plurality of driving electrodes and a plurality of sensing electrodes. A display driver is configured to drive the plurality of pixels. A touch driver is configured to drive the plurality of driving electrodes and the plurality of sensing electrodes. The display driver includes a first switching element configured to selectively connect one of a first lead line connected to a first pad and a second lead line connected to a second pad to the gate line.

In an embodiment, the display driver may receive a data voltage or a gate control signal through the first lead line, and the display driver may receive a touch driving signal through the second lead line.

In an embodiment, the common electrode may receive a low-level voltage if the first lead line is connected to the gate line, and the common electrode may be grounded to a certain voltage or earth if the second lead line is connected to the gate line.

In an embodiment, the display device may further comprise: a driving voltage line disposed above the gate line, extended in a second direction crossing the first direction, and connected to the plurality of pixels. The driving voltage line may receive a driving voltage if the first lead line is connected to the gate line, and the driving voltage line may be grounded to a certain voltage or earth if the second lead line is connected to the gate line.

In an embodiment, the display device may further comprise: a data line extended in a second direction crossing the first direction and connected to the plurality of pixels, and a second switching element configured to selectively connect one of the first lead line and the second lead line to the data line.

In an embodiment, the display device may further comprise: a driving voltage line disposed above the data line, extended in the second direction, and connected to the plurality of pixels. The driving voltage line may receive a driving voltage if the first lead line is connected to the data line, and the driving voltage line may be grounded to a certain voltage or earth if the second lead line is connected to the data line.

According to an embodiment of the present inventive concepts, a display device includes a display unit having a plurality of pixels. Each of the plurality of pixels has a gate line and a data line connected thereto. A touch sensing unit includes a plurality of sensing electrodes. A display driver is configured to drive the plurality of pixels. A touch driver is configured to supply a driving signal to the gate line or the data line to receive a touch sensing signal from the plurality of sensing electrodes. The touch driver is configured to compare a coupling capacitance between the display unit and the touch sensing unit at different positions.

According to embodiments of the present inventive concepts, it is possible to detect the coupling capacitance between a display unit and a touch sensing unit by supplying a touch driving signal to a gate line or a data line of the display unit and receiving a touch sensing signal from a sensing electrode of the touch sensing unit. As a common electrode or a driving voltage line is grounded to a certain voltage or the earth, it is possible to reduce or prevent the formation of a coupling capacitance between the display unit and the touch sensing unit. Accordingly, by comparing the coupling capacitances at different positions between the display unit and the touch sensing unit, the display device can check the degradation degree of the quality at the different positions of the common electrode and the driving voltage line that may possibly block electrical signals between the display unit and the touch sensing unit. In addition, it is possible to quantify the degradation degree of the quality of the common electrode and the driving voltage line.

It should be noted that effects of the present inventive concepts are not limited to those described above and other effects of the present inventive concepts will be apparent to those skilled in the art from the following descriptions.

BRIEF DESCRIPTION OF THE DRAWINGS

The above and other aspects and features of the present inventive concepts will become more apparent by describing in detail embodiments thereof with reference to the attached drawings, in which.

DETAILED DESCRIPTION OF EMBODIMENTS

Figure 1:
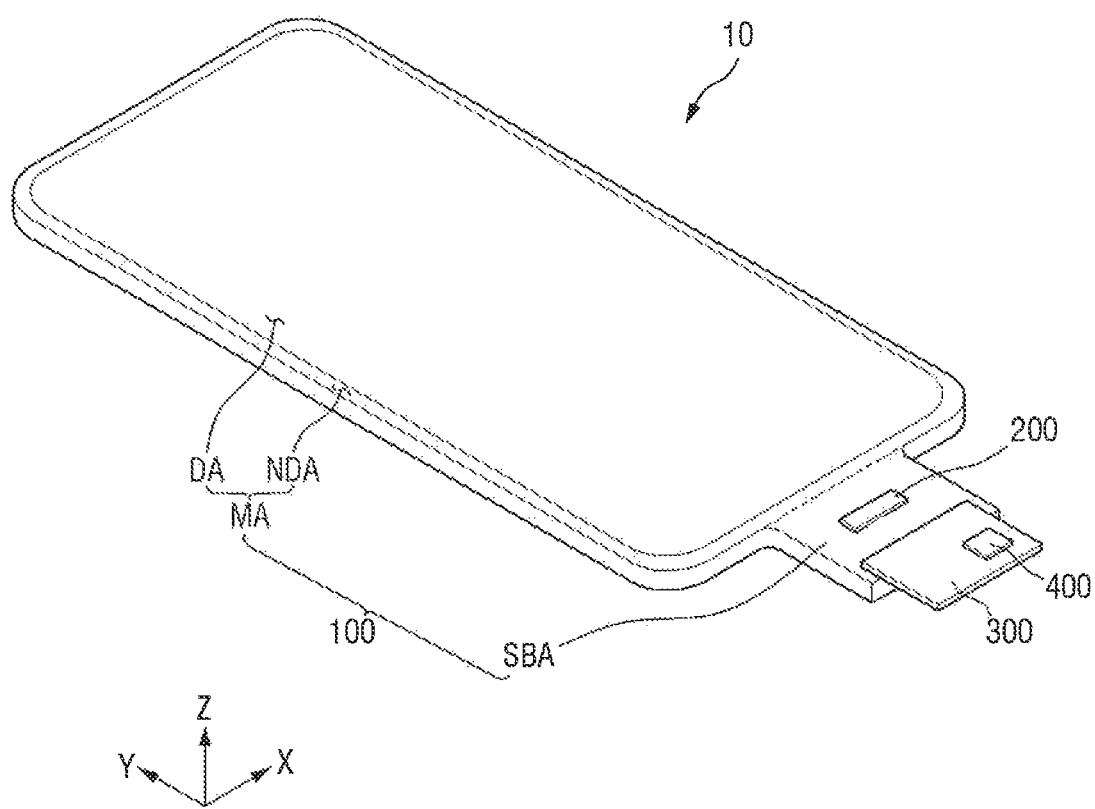
FIG. 1 is a perspective view showing a display device according to an embodiment of the present inventive concepts.

In the following description, for the purposes of explanation, numerous details are set forth to provide a thorough understanding of various embodiments or implementations of the present inventive concepts. As used herein "embodiments" and "implementations" are interchangeable words that are non-limiting examples of devices or methods employing one or more of the implementations or embodiments disclosed herein. It is apparent, however, that various embodiments may be practiced without these details or with one or more equivalent arrangements. In other instances, structures and devices may be shown in block diagram form to avoid unnecessarily obscuring various embodiments. Further, various embodiments may be different, but do not have to be exclusive. For example, shapes, configurations, and characteristics of an embodiment may be used or implemented in other embodiments without departing from the scope of the present inventive concepts.

Unless otherwise specified, the illustrated embodiments are to be understood as providing features of varying detail of some or a number of ways in which the present inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the present inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein interpreted accordingly.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In an embodiment in which a third element intervenes between the first and second element, the first and second element may be understood as being indirectly opposed to one another, although still facing each other.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," "has," and/or "having," and/or variations thereof when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For example, "about" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Various embodiments are described herein with reference to cross-sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. Also, each block, unit, and/or module of some or a number of embodiments may be physically separated into two or more interacting and discrete blocks, units, and/or modules without departing from the scope of the disclosure. Further, the blocks, units, and/or modules of some or a number of embodiments may be physically combined into more complex blocks, units, and/or modules without departing from the scope of the present inventive concepts.

Unless otherwise defined, all terms (including technical and scientific terms) used herein have the same meaning as commonly understood by one of ordinary skill in the art to which the present inventive concepts pertain. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view showing a display device according to an embodiment of the present inventive concepts.

Referring to the embodiment of FIG. 1, a display device 10 may be employed by portable electronic devices such as a mobile phone, a smart phone, a tablet PC, a mobile communications terminal, an electronic notebook, an electronic book, a portable multimedia player (PMP), a navigation device and an ultra mobile PC (UMPC). For example, the display device 10 may be used as a display unit of a television, a laptop computer, a monitor, an electronic billboard, or the Internet of Things (IOT). The display device 10 may also be applied to wearable devices such as a smart watch, a watch phone, a glasses-type display, and a head-mounted display (HMD) device. The display device 10 may also be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle. However, embodiments of the present inventive concepts are not limited thereto and the display device 10 may be applied to various other small, medium and large-sized electronic devices.

As shown in the embodiment of FIG. 1, the display device 10 may have a shape similarly to a quadrangular shape when viewed from the top. For example, the display device 10 may have a shape similar to a quadrangle having relatively shorter sides in a direction parallel to the x-axis (hereinafter, the "X direction") and relatively longer sides in a direction parallel to the y-axis (hereinafter, the "Y direction") when viewed from the top. Each of the corners where the relatively shorter side in the X direction meets the relatively longer side in the Y direction may be rounded with a predetermined curvature or may be a right angle. However, embodiments of the present inventive concepts are not limited thereto. The shape of the display device 10 when viewed from the top is not limited to a quadrangular shape, but may be formed in a shape similar to other polygonal shapes, a circular shape, an elliptical shape, etc.

The display device 10 may include a display panel 100, a display driver 200, a circuit board 300 and a touch driver 400.

The display panel 100 may include a main area MA and a subsidiary area SBA.

The main area MA may include a display area DA having pixels for displaying images, and a non-display area NDA located around the display area DA. For example, the non-display area NDA may completely surround the display area DA (e.g., in the X and Y directions). However, embodiments of the present inventive concepts are not limited thereto and the display area DA may not be surrounded by the non-display area NDA on at least one side in some embodiments. The display area DA may emit light from a plurality of emission areas or a plurality of opening areas. For example, the display panel 100 may include a pixel circuit including switching elements, a pixel-defining layer that defines the emission areas or the opening areas, and a self-light-emitting element.

For example, in an embodiment, the self-light-emitting element may include at least one of an organic light-emitting diode including an organic emissive layer, a quantum-dot light-emitting diode including a quantum-dot emissive layer, and an inorganic light-emitting diode including an inorganic semiconductor. However, embodiments of the present inventive concepts are not limited thereto.

The non-display area NDA may be disposed on the outer side of the display area DA. The non-display area NDA may be defined as the edge area of the main area MA of the display panel 100. The non-display area NDA may include a gate driver that applies gate signals to gate lines, and fan-out lines that connect the display driver 200 with the display area DA.

The subsidiary area SBA may be extended from one side of the main area MA. For example, as shown in the embodiment of FIG. 1, the subsidiary area SBA may be extended from the lower side of the main area MA (e.g., in the Y direction). However, embodiments of the present inventive concepts are not limited thereto. In an embodiment, the subsidiary area SUB may include a flexible material that can be bent, folded, or rolled. For example, when the subsidiary area SBA is bent, the subsidiary area SBA may overlap the main area MA in the thickness direction that is a direction parallel to the z-axis (hereinafter, the "Z direction"). The subsidiary area SBA may include pads connected to the display driver 200 and the circuit board 300. However, embodiments of the present inventive concepts are not limited thereto. For example, in an embodiment, the subsidiary area SBA may be eliminated, and the display driver 200 and the pads may be disposed in the non-display area NDA.

The display driver 200 may output signals and voltages for driving the display panel 100. The display driver 200 may supply data voltages to data lines. The display driver 200 may apply a supply voltage to a voltage line and may supply gate control signals to the gate driver. In an embodiment, the display driver 200 may be implemented as an integrated circuit (IC) and may be attached on the display panel 100 by a chip-on-glass (COG) technique, a chip-on-plastic (COP) technique, or ultrasonic bonding. However, embodiments of the present inventive concepts are not limited thereto. For example, the display driver 200 may be disposed in the subsidiary area SBA and may overlap with the main area MA in the thickness direction (e.g., the Z direction) as the subsidiary area SBA is bent. In an embodiment, the display driver 200 may be mounted on the circuit board 300.

The circuit board 300 may be attached on the pads of the display panel 100 using an anisotropic conductive film (ACF). Lead lines of the circuit board 300 may be electrically connected to the pads of the display panel 300. In an embodiment, the circuit board 300 may be a flexible printed circuit board (FPCB), a printed circuit board (PCB), or a flexible film such as a chip-on-film (COF). However, embodiments of the present inventive concepts are not limited thereto.

In an embodiment, the touch driver 400 may be mounted on the circuit board 300. The touch driver 400 may be connected to a touch sensing unit of the display panel 100. The touch driver 400 may supply a touch driving signal to a plurality of touch electrodes of the touch sensing unit and may sense a change in the capacitance between the plurality of touch electrodes. For example, the touch driving signal may be a pulse signal having a predetermined frequency. The touch driver 400 may determine whether a touch is input and may calculate the coordinates of the touch based on the amount of the change in the capacitance between the touch electrodes. In an embodiment, the touch driver 400 may be implemented as an integrated circuit (IC). However, embodiments of the present inventive concepts are not limited thereto.

Figure 2:
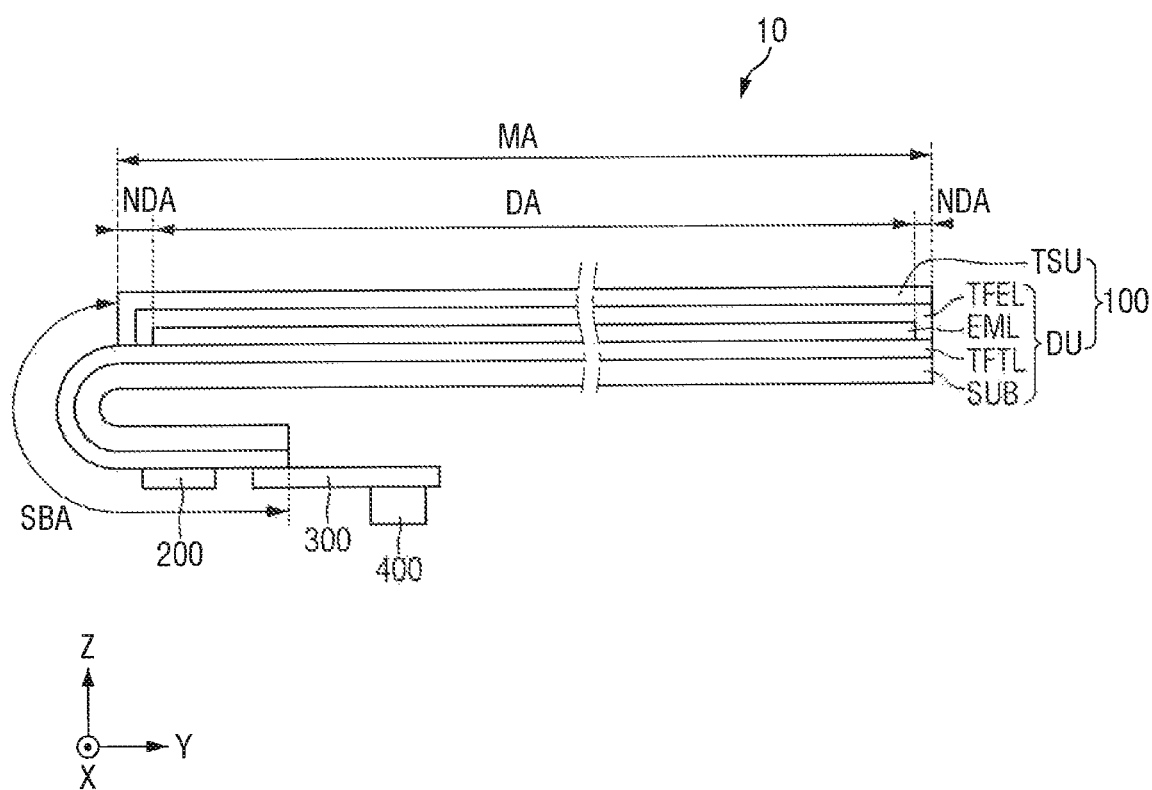
FIG. 2 is a cross-sectional view showing a display device according to an embodiment of the present inventive concepts.

FIG. 2 is a cross-sectional view showing a display device according to an embodiment of the present inventive concepts.

Referring to FIG. 2, the display panel 100 may include a display unit DU and a touch sensing unit TSU. The display unit DU may include a substrate SUB, a thin-film transistor layer TFTL, an emission material layer EML and an encapsulation layer TFEL.

In an embodiment, the substrate SUB may be a base substrate or a base member and may be made of an insulating material such as a polymer resin. For example, the substrate SUB may be a flexible substrate that can be bent, folded, or rolled. In an embodiment in which the substrate SUB is a flexible substrate, it may be formed of, but is not limited to, polyimide (PI).

The thin-film transistor layer TFTL may be disposed on the substrate SUB (e.g., directly thereon in the Z direction). The thin-film transistor layer TFTL may include a plurality of thin-film transistors forming pixel circuits of pixels. In an embodiment, the thin-film transistor layer TFTL may include gate lines, data lines, voltage lines, gate control lines, fan-out lines for connecting the display driver 200 with the data lines, lead lines for connecting the display driver 200 with the pads, etc. Each of the thin-film transistors may include a semiconductor region, a source electrode, a drain electrode, and a gate electrode. For example, when the gate driver is formed on one side of the non-display area NDA of the display panel 100, the gate driver may include thin-film transistors.

In an embodiment, the thin-film transistor layer TFTL may be disposed in the display area DA, the non-display area NDA and the subsidiary area SBA. The thin-film transistors in each of the pixels, the gate lines, the data lines and the voltage lines in the thin-film transistor layer TFTL may be disposed in the display area DA. The gate control lines and the fan-out lines in the thin-film transistor layer TFTL may be disposed in the non-display area NDA. The lead lines of the thin-film transistor layer TFTL may be disposed in the subsidiary area SBA.

The emission material layer EML may be disposed on the thin-film transistor layer TFTL (e.g., directly thereon in the Z direction). The emission material layer EML may include a plurality of light-emitting elements. Each of the plurality of light-emitting elements of the emission material layer EML may include a first electrode, an emissive layer and a second electrode that are stacked on one another sequentially to emit light, and a pixel-defining layer for defining the pixels. The plurality of light-emitting elements in the emission material layer EML may be disposed in the display area DA.

For example, in an embodiment, the emissive layer may be an organic emissive layer containing an organic material. The emissive layer may include a hole transporting layer, an organic light-emitting layer and an electron transporting layer. When a voltage is applied to the first electrode and a cathode voltage is applied to the second electrode through the thin-film transistors on the thin-film transistor layer TFTL, the holes and electrons may move to the organic light-emitting layer through the hole transporting layer and the electron transporting layer, respectively, such that they combine in the organic light-emitting layer to emit light. For example, in an embodiment, the first electrode may be an anode electrode and the second electrode may be a cathode electrode. However, embodiments of the present inventive concepts are not limited thereto.

In an embodiment, the emission material layer EML may include a quantum-dot light-emitting diode including a quantum-dot emissive layer or an inorganic light-emitting diode including an inorganic semiconductor.

The encapsulation layer TFEL may cover the upper and side surfaces of the emission material layer EML, and can protect the emission material layer EML. In an embodiment, the encapsulation layer TFEL may include at least one inorganic layer and at least one organic layer for encapsulating the emission material layer EML.

The touch sensing unit TSU may be disposed on the encapsulation layer TFEL (e.g., directly thereon in the Z direction). The touch sensing unit TSU may include a plurality of touch electrodes for sensing a user's touch by capacitive sensing, and touch lines connecting the plurality of touch electrodes with the touch driver 400. For example, the touch sensor unit TSU may sense a user's touch by self-capacitance sensing or mutual capacitance sensing. However, embodiments of the present inventive concepts are not limited thereto.

For example, in an embodiment, the touch sensing unit TSU may be disposed on a separate substrate disposed on the display unit DU. In this embodiment, the substrate supporting the touch sensing unit TSU may be a base member encapsulating the display unit DU.

The plurality of touch electrodes of the touch sensing unit TSU may be disposed in a touch sensor area overlapping the display area DA (e.g., in the Z direction). The touch lines of the touch sensing unit TSU may be disposed in a touch peripheral area overlapping the non-display area NDA (e.g., in the Z direction). For example, a polarizing film and a cover window may be additionally disposed on the touch sensing unit TSU. For example, the polarizing film may be disposed on the touch sensing unit TSU, and the cover window may be disposed on the polarizing film by an adhesive member.

Figure 3:
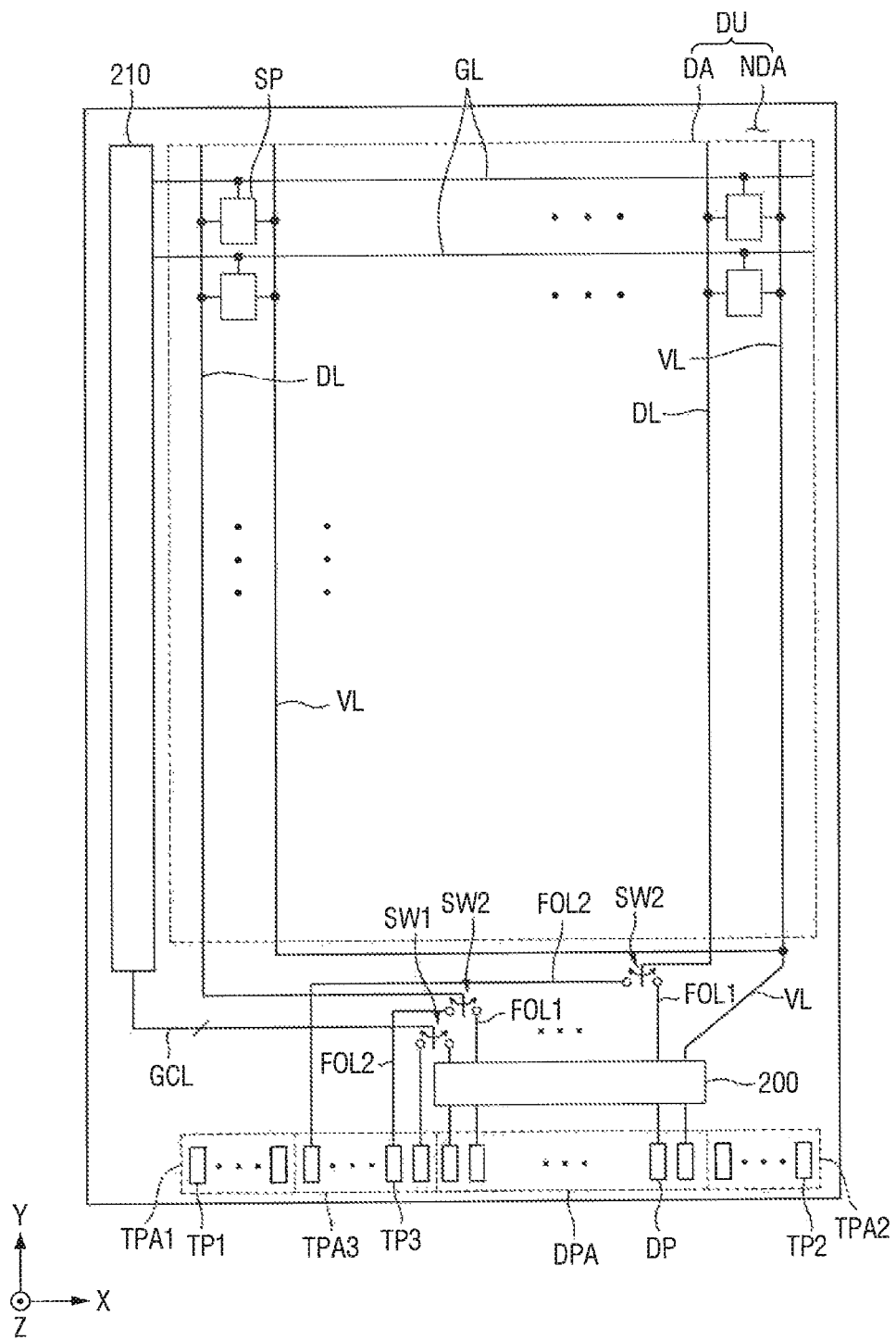
FIG. 3 is a plan view showing a display unit of a display device according to an embodiment of the present inventive concepts.

FIG. 3 is a plan view showing a display unit of a display device according to an embodiment of the present inventive concepts.

Referring to the embodiment of FIG. 3, the display unit DU may include a display area DA and a non-display area NDA.

The display area DA is an area for displaying images and may be defined as a central area (e.g., in the X and Y directions) of the display panel 100. However, embodiments of the present inventive concepts are not limited thereto and the display area DA may be positioned in various different areas of the display panel 100. The display area DA may include a plurality of pixels SP, a plurality of gate lines GL, a plurality of data lines DL and a plurality of voltage lines VL. Each of the plurality of pixels SP may be defined as a region of a minimum unit that outputs light.

The plurality of gate lines GL may supply the gate signals received from the gate driver 210 to the plurality of pixels SP. As shown in the embodiment of FIG. 3, the plurality of gate lines GL may extend longitudinally in the X direction and may be spaced apart from each other in the Y direction crossing the X direction.

The plurality of data lines DL may supply the data voltages received from the display driver 200 to the plurality of pixels SP. The plurality of data lines DL may extend in the Y direction and may be spaced apart from each other in the X direction.

The plurality of voltage lines VL may supply the supply voltage received from the display driver 200 to the plurality of pixels SP. The supply voltage may be at least one of a driving voltage, an initialization voltage, and a reference voltage. The plurality of voltage lines VL may extend in the Y direction and may be spaced apart from each other in the X direction.

The non-display area NDA may surround the display area DA. As shown in the embodiment of FIG. 3, the non-display area NDA may include the display driver 200, the gate driver 210, first fan-out lines FOL1, second fan-out lines FOL2, gate control lines GCL, a first switching element SW1, a second switching element SW2, a display pad area DPA, and first to third touch pad areas TPA1, TPA2 and TPA3.

The display driver 200 may output signals and voltages for driving the display panel 100 to the first fan-out lines FOL1. The first switching element SW1 may connect the first fan-out lines FOL1 to a gate control line GCL in a first mode. Herein, the first mode may be a display mode of the display device 10. In an embodiment, the display device 10 may display at least one still and/or moving image in the first mode depending on its use. Accordingly, the display driver 200 may supply a gate control signal to the gate driver 210 through the gate control line GCL in the first mode. The gate driver 210 may generate a plurality of gate signals based on the gate control signal in the first mode, and may sequentially supply the plurality of gate signals to the plurality of gate lines GL in a predetermined order.

The second switching element SW2 may connect the display driver 200 to the data lines DL in the first mode. Accordingly, the display driver 200 may supply the data voltages to the plurality of pixels SP through the data lines DL in the first mode. By supplying the data voltages to the plurality of pixels SP, the luminance of the plurality of pixels SP may be determined.

The first fan-out lines FOL1 may extend from the display driver 200 to the first switching element SW1 or the second switching element SW2. A first partial portion of the first fan-out lines FOL1 may be connected to the first switching element SW1 in the first mode to supply the gate control signal received from the display driver 200 to the gate control line GCL. A second partial portion of the first fan-out lines FOL1 that is different from the first partial portion of the first fan-out lines FOL1 may be connected to the second switching element SW2 in the first mode to supply the data voltage received from the display driver 200 to the plurality of data lines DL.

The first switching element SW1 may connect the third touch pads TP3 to the gate control line GCL via the second fan-out lines FOL2 in a second mode. Herein, the second mode may be a coupling-noise sensing mode of the display device 10. The display device 10 may detect coupling capacitance between the display unit DU and the touch sensing unit TSU in the second mode. Accordingly, the touch driver 400 may supply a touch driving signal to the gate driver 210 through the third touch pads TP3 and the gate control line GCL in the second mode. Herein, the touch driving signal may be a pulse signal having a predetermined frequency. The gate driver 210 may sequentially supply the received touch driving signal to the plurality of gate lines GL in a predetermined order in the second mode. The touch driver 400 can detect the coupling capacitance between the gate lines GL and the touch sensing unit TSU by receiving a touch sensing signal from the touch sensing unit TSU.

The second switching element SW2 may connect the third touch pads TP3 to the data lines DL via the second fan-out lines FOL2 in the second mode. Accordingly, the touch driver 400 may supply the touch driving signal to the plurality of data lines DL through the third touch pads TP3 in the second mode. The touch driver 400 can detect the coupling capacitance between the data line DL and the touch sensing unit TSU by receiving a touch sensing signal from the touch sensing unit TSU.

The second fan-out lines FOL2 may extend from the third touch pads TP3 to the first switching element SW1 or the second switching element SW2. A first partial portion of the second fan-out lines FOL2 may be connected to the first switching element SW1 in the second mode to supply the touch driving signal received from the third touch pads TP3 connected to the touch driver 400 to the gate control line GCL. A second partial portion of the second fan-out lines FOL2 may be connected to the second switching element SW2 in the second mode to supply the touch driving signal to the plurality of data lines DL.

As shown in the embodiment of FIG. 3, the display pad area DPA and the first to third touch pad areas TPA1, TPA2 and TPA3 may be disposed at the edge of the non-display area NDA. For example, the display pad area DPA and the first to third touch pad areas TPA1, TPA2 and TPA3 may be disposed at a lower edge (e.g., in the Y direction) of the non-display area NDA. In an embodiment, the display pad area DPA and the first to third touch pad areas TPA1, TPA2 and TPA3 may be electrically connected to the circuit board 300 using an anisotropic conductive film or a low-resistance high-reliability material such as an SAP.

The display pad area DPA may include a plurality of display pads DP. The plurality of display pads DP may supply signals and voltages received from the circuit board 300 to the display driver 200. The plurality of display pads DP may be connected to a main processor through the circuit board 300. The plurality of display pads DP may be connected to the circuit board 300 to receive digital video data, such as data for at least one moving and/or still image, and may supply digital video data to the display driver 200. The plurality of display pads DP may be connected to the circuit board 300 to receive the supply voltage and may supply the supply voltage to the display driver 200.

The third touch pad area TPA3 may be disposed on one side of the display pad area DPA and may include a plurality of third touch pads TP3. For example, as shown in the embodiment of FIG. 3, the third touch pad area TA may be disposed on a central portion (e.g., in the X direction) of the display pad area DPA. The plurality of third touch pads TP3 may be connected to the touch driver 400 disposed on the circuit board 300. The plurality of third touch pads TP3 may supply the touch driving signal received from the touch driver 400 to the second fan-out lines FOL2.

Figure 4:
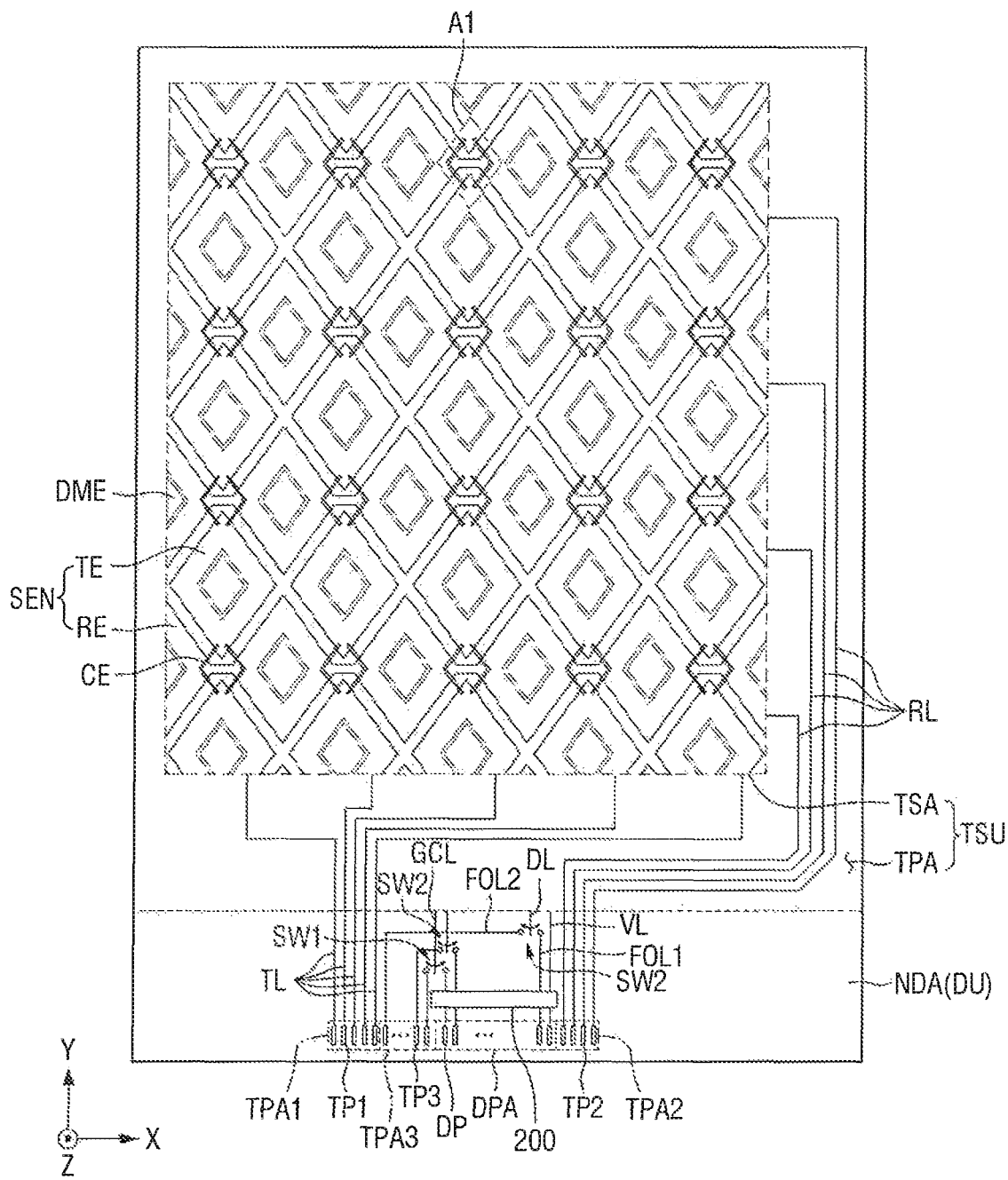
FIG. 4 is a plan view showing a touch sensing unit of a display device according to an embodiment of the present inventive concepts.

FIG. 4 is a plan view showing a touch sensing unit of a display device according to an embodiment of the present inventive concepts.

Referring to the embodiment of FIG. 4, the touch sensing unit TSU may include a touch sensor area TSA that senses a user's touch, and a touch peripheral area TPA disposed around the touch sensor area TSA. In an embodiment, the touch sensor area TSA may overlap the display area DA of the display panel 100, and the touch peripheral area TPA may overlap the non-display area NDA of the display panel 100.

The touch sensor area TSA may include a plurality of touch electrodes SEN and a plurality of dummy electrodes DME. The plurality of touch electrodes SEN may form mutual capacitance or self capacitance to sense a touch of an object or person. The plurality of touch electrodes SEN may include a plurality of driving electrodes TE and a plurality of sensing electrodes RE.

As shown in the embodiment of FIG. 4, the driving electrodes TE may be arranged in the X direction and in the Y direction. The driving electrodes TE may be spaced apart from one another in the X direction and in the Y direction. The driving electrodes TE adjacent to one another in the Y direction may be electrically to one another through bridge electrodes CE.

The touch driver 400 may drive the plurality of driving electrodes TE and the plurality of sensing electrodes RE. The plurality of driving electrodes TE may be connected to the first touch pads TP1 through driving lines TL. For example, the driving electrodes TE disposed on the lower side (e.g., in the Y direction) of the touch sensor area TSA may be connected to the first touch pads TP1 through the driving lines TL. The driving lines TL may extend to the first touch pads TP1 through the lower side of the touch peripheral area TPA and the non-display area NDA. The first touch pads TP1 may be connected to the touch driver 400 through the circuit board 300.

The bridge electrodes CE may be bent at least once. Although as shown in the embodiment of FIG. 4, the bridge electrodes CE may have the shape of angle brackets "<" or ">", the shape of the bridge electrodes CE when viewed from the top is not limited thereto and the bridge electrodes CE may have various different shapes. The driving electrodes TE adjacent to one another in the Y direction may be connected by the plurality of bridge electrodes CE. Even in an instance in which one of the bridge electrodes CE is disconnected, the driving electrodes TE can be stably connected through the remaining bridge electrodes CE. The driving electrodes TE adjacent to each other in the Y direction may be connected by two bridge electrodes CE. However, embodiments of the present inventive concepts are not limited thereto and the number of bridge electrodes CE may vary.

The bridge electrodes CE may be disposed on a different layer from the plurality of driving electrodes TE and the plurality of sensing electrodes RE. The sensing electrodes RE adjacent to one another in the X direction may be electrically connected through connectors disposed on the same layer as the plurality of driving electrodes TE or the plurality of sensing electrodes RE. The driving electrodes TE adjacent to one another in the Y direction may be electrically connected through the bridge electrodes CE disposed on a different layer from the plurality of driving electrodes TE or the plurality of sensing electrodes RE. Accordingly, even though the bridge electrodes CE overlap with the plurality of sensing electrodes RE in the thickness direction (e.g., the Z direction), the plurality of driving electrodes TE and the plurality of sensing electrodes RE can be insulated from each other. Mutual capacitance may be formed between the driving electrodes TE and the sensing electrodes RE.

In an embodiment, the sensing electrodes RE may extend in the X direction and may be spaced apart from one another in the Y direction. The plurality of sensing electrodes RE may be arranged in the X direction and the Y direction, and the sensing electrodes RE adjacent to one another in the X direction may be electrically connected through connectors.

The plurality of sensing electrodes RE may be connected to the second touch pads TP2 through sensing lines RL. For example, the sensing electrodes RE disposed on the right side of the touch sensor area TSA may be connected to the second touch pads TP2 through the sensing lines RL. However, embodiments of the present inventive concepts are not limited thereto. The sensing lines RL may extend to the second touch pads TP2 through the right side of the touch peripheral area TPA and the non-display area NDA. The second touch pads TP2 may be connected to the touch driver 400 through the circuit board 300.

Each of the plurality of dummy electrodes DME may be surrounded by the driving electrode TE or the sensing electrode RE. Each of the plurality of dummy electrodes DME may be spaced apart from and insulated from the driving electrode TE or the sensing electrode RE. Accordingly, the dummy electrodes DME may be electrically floating.

The first touch pad area TPA1 may be disposed on one side of the third touch pad area TPA3 and may include a plurality of first touch pads TP1. For example, as shown in the embodiment of FIG. 4, the first touch pad area TPA1 may be disposed on the left side of the third touch pad area TPA3. However, embodiments of the present inventive concepts are not limited thereto. The plurality of first touch pads TP1 may be connected to the touch driver 400 disposed on the circuit board 300. The touch driver 400 may supply touch driving signals to the plurality of driving electrodes TE through the plurality of first touch pads TP1 and the plurality of driving lines TL in the first mode. The touch driving signal may be a pulse signal having a predetermined frequency.

The second touch pad area TPA2 may be disposed on the opposite side of the display pad area DPA and may include a plurality of second touch pads TP2. For example, as shown in the embodiment of FIG. 4, the second touch pad area TPA2 is disposed on the right side of the third touch pad area TPA3. The plurality of second touch pads TP2 may be connected to the touch driver 400 disposed on the circuit board 300. The touch driver 400 may receive a touch sensing signal through a plurality of sensing lines RL connected to the plurality of second touch pads TP2. The touch driver 400 may sense a change in mutual capacitance between the driving electrodes TE and the sensing electrodes RE in the first mode.

In an embodiment, the touch driver 400 may supply a touch driving signal to the gate lines GL in the second mode and may receive a touch sensing signal from the sensing electrodes RE. The touch driver 400 may sense a change in mutual capacitance between the gate lines GL and the sensing electrodes RE in the second mode, thereby detecting the coupling capacitance between the gate lines GL and the sensing electrodes RE.

The touch driver 400 may supply a touch driving signal to the data lines DL in the second mode and may receive a touch sensing signal from the sensing electrodes RE. The touch driver 400 may sense a change in the mutual capacitance between the gate lines GL and the sensing electrodes RE in the second mode, thereby detecting the coupling capacitance between the data lines DL and the sensing electrodes RE.

Alternatively, the touch driver 400 may supply the touch driving signal to the gate lines GL or the data lines DL in the second mode and may receive a touch sensing signal from each of the plurality of driving electrodes TE and the plurality of sensing electrode RE. Accordingly, the touch driver 400 may detect the coupling capacitance between the gate lines GL and the driving electrodes TE and the coupling capacitance between the gate lines GL and the sensing electrodes RE. In addition, the touch driver 400 may detect the coupling capacitance between the data lines DL and the driving electrodes TE and the coupling capacitance between the data lines DL and the sensing electrodes RE.

Figure 5:
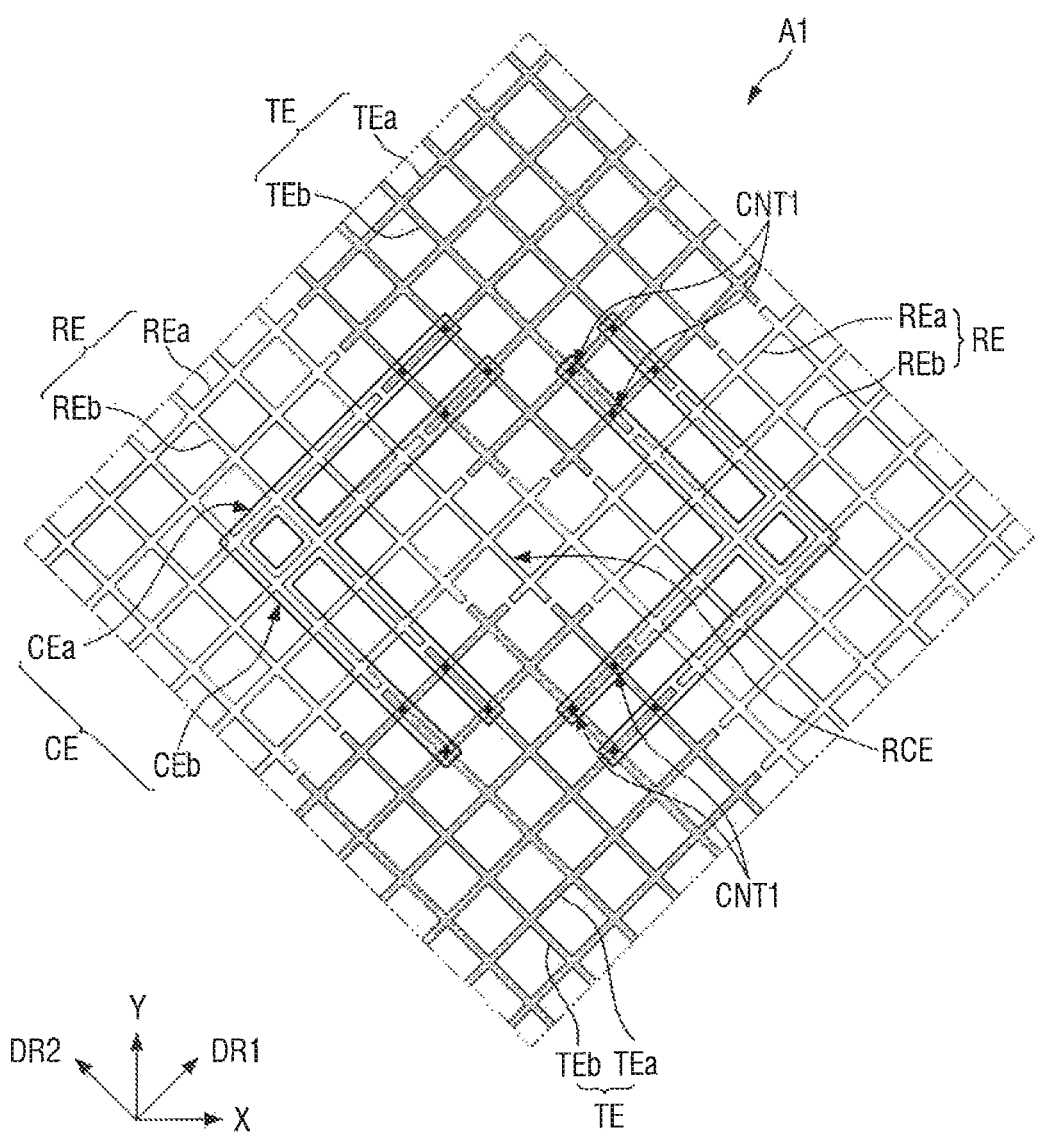
FIG. 5 is an enlarged view of area A1 of FIG. 4 according to an embodiment of the present inventive concepts.
Figure 6:
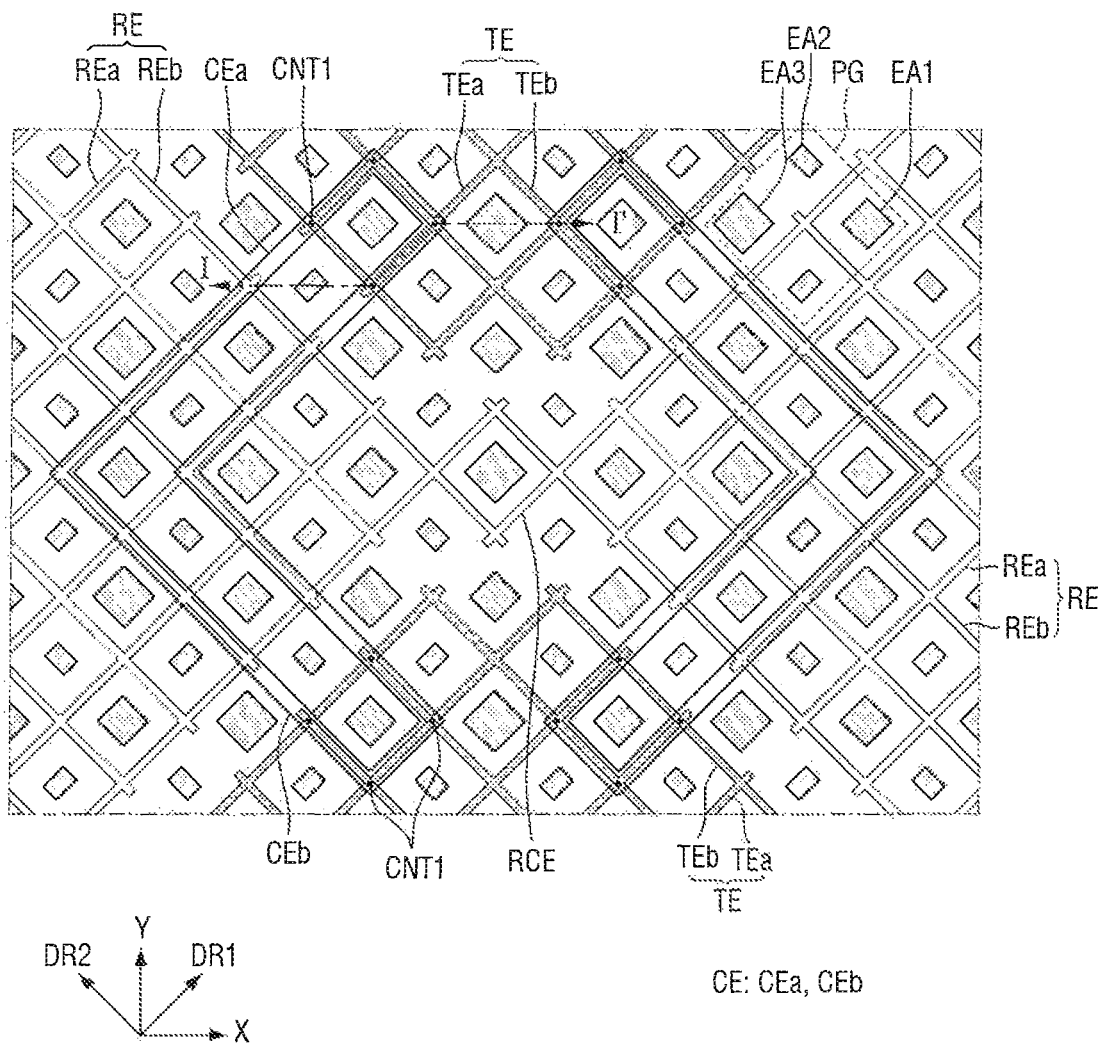
FIG. 6 is an enlarged view showing a part of a display device according to an embodiment of the present inventive concepts.

FIG. 5 is an enlarged view of area A1 of FIG. 4. FIG. 6 is an enlarged view showing a part of a display device according to an embodiment of the present inventive concepts.

Referring to the embodiments of FIGS. 5 and 6, a plurality of driving electrodes TE, a plurality of sensing electrodes RE and a plurality of dummy electrodes DME may be disposed on the same layer and may be spaced apart from one another.

The driving electrodes TE may be arranged in the X direction and in the Y direction. The driving electrodes TE may be spaced apart from one another in the X direction and in the Y direction. The driving electrodes TE adjacent to one another in the Y direction may be electrically to one another through bridge electrodes CE.

The sensing electrodes RE may extend in the X direction and may be spaced apart from one another in the Y direction. The plurality of sensing electrodes RE may be arranged in the X direction and the Y direction, and the sensing electrodes RE adjacent to one another in the X direction may be electrically connected through connectors RCE. For example, the connectors RCE of the sensing electrodes RE may be disposed between the shortest distance between the driving electrodes TE adjacent to each other in the Y direction.

The bridge electrodes CE may be disposed on a different layer from the plurality of driving electrodes TE and the plurality of sensing electrodes RE. Each of the bridge electrodes CE may include a first portion CEa and a second portion CEb. For example, the second portion CEb of the bridge electrode CE may be connected to the driving electrode TE disposed on one side through a first contact hole CNT1 and may extend in a second direction DR2. The first portion CEa of the bridge electrode CE may be bent from the second portion CEb where it overlaps the sensing electrode RE to extend in the first direction DR1, and may be connected to the driving electrode TE disposed on the other side through a first contact hole CNT1. For example, as shown in the embodiment of FIG. 5, the second portion CEb may be connected to a driving electrode TE disposed on a lower side (e.g., in the Y direction) and the first portion CEa may be connected to a driving electrode TE disposed on an upper side (e.g., in the Y direction). As used herein, the first direction DR1 may refer to the direction between the X direction and the Y direction, and the second direction DR2 may refer to the direction crossing the direction DR1. For example, the first direction DR1 and the second direction DR2 may be perpendicular to each other. However, embodiments of the present inventive concepts are not limited thereto. Accordingly, each of the plurality of bridge electrodes CE may connect between driving electrodes TE adjacent to each other in the Y direction.

For example, the plurality of driving electrodes TE, the plurality of sensing electrodes RE and the plurality of dummy patterns DME may be formed in a mesh or net pattern when viewed from the top. Accordingly, the plurality of driving electrodes TE, the plurality of sensing electrodes RE and the plurality of dummy electrodes DME may not overlap with the first to third emission areas EA1, EA2, and EA3 of the pixel group PG. The plurality of bridge electrodes CE may not overlap with the first to third emission areas EA1, EA2 and EA3, either. Accordingly, the display device 10 prevents the brightness of the light exiting from the first to third emission areas EA1, EA2 and EA3 from being lowered by the touch sensing unit TSU.

Each of the plurality of driving electrodes TE may include a first portion TEa that extends in the first direction DR1 and a second portion TEb that extends in the second direction DR2. Each of the plurality of sensing electrodes RE may include a first portion REa that extends in the first direction DR1 and a second portion REb that extends in the second direction DR2. However, embodiments of the present inventive concepts are not limited thereto.

For example, in an embodiment, the plurality of driving electrodes TE, the plurality of sensing electrodes RE and the plurality of dummy patterns DME may be formed as whole surfaces when viewed from the top, instead of a mesh or net pattern. In this embodiment, the plurality of driving electrodes TE, the plurality of sensing electrodes RE and the plurality of dummy electrodes DME may include a transparent conductive material having high transmittance, such as ITO and IZO, and the luminance of light emitted from the first to third emission areas EA1, EA2 and EA3 may be prevented from being decreased.

The plurality of pixels may include first to third sub-pixels. The first to third sub-pixels may include the first to third light emission areas EA1, EA2 and EA3. For example, in an embodiment, the first emission area EA1 may emit light of a first color or red light, the second emission area EA2 may emit light of a second color or green light, and the third emission area EA3 may emit light of a third color or blue light. However, embodiments of the present inventive concepts are not limited thereto and the number of sub-pixels and the colors emitted by the sub-pixels may vary.

As shown in the embodiment of FIG. 6, a single pixel group PG may include one first emission area EA1, two second emission areas EA2 and one third emission area EA3 to represent black-and-white grayscale levels. Accordingly, a black-and-white grayscale level can be represented by a combination of light emitted from one first emission area EA1, light emitted from two second emission areas EA2, and light emitted from one third emission areas EA3. However, embodiments of the present inventive concepts are not limited thereto.

Figure 7:
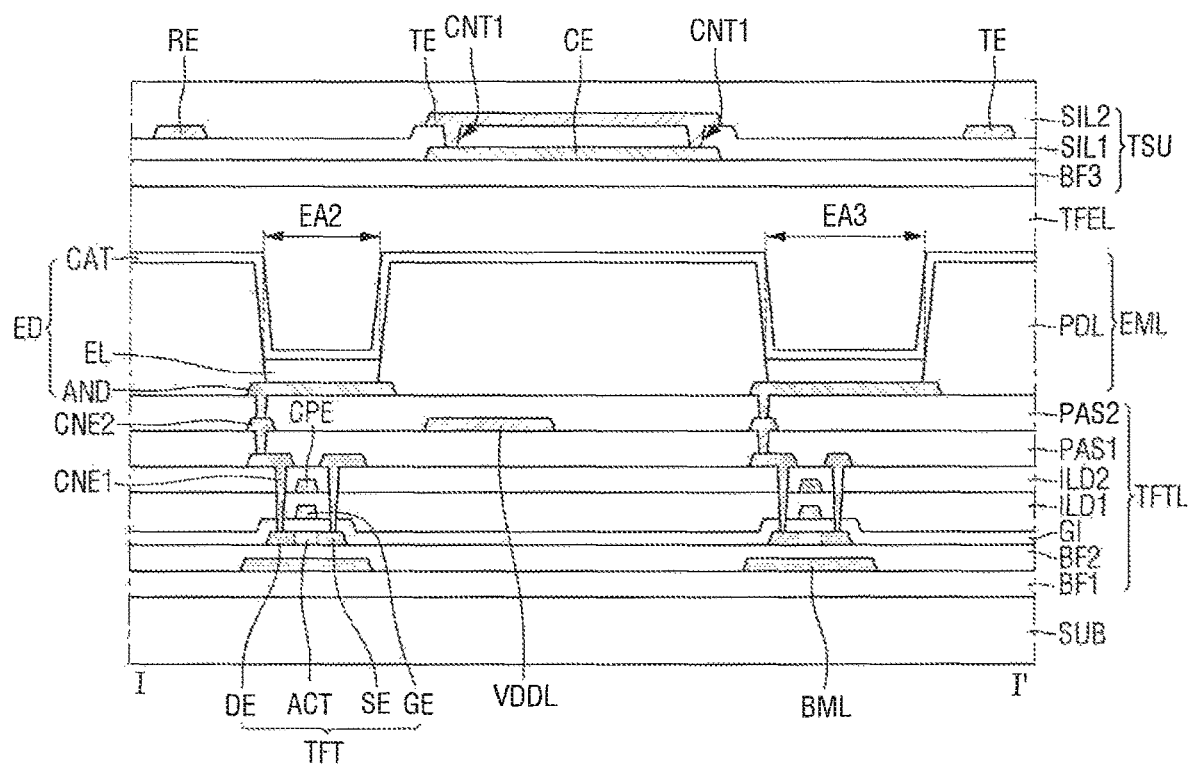
FIG. 7 is a cross-sectional view, taken along line I-I' of FIG. 6 according to an embodiment of the present inventive concepts.

FIG. 7 is a cross-sectional view, taken along line I-I' of FIG. 6.

Referring to the embodiment of FIG. 7, the display panel 100 may include the display unit DU and the touch sensing unit TSU. The display unit DU may include a substrate SUB, a thin-film transistor layer TFTL, an emission material layer EML and an encapsulation layer TFEL.

The substrate SUB may support the display panel 100. In an embodiment, the substrate SUB may be a base substrate or a base member and may be made of an insulating material such as a polymer resin. For example, the substrate SUB may be a flexible substrate that can be bent, folded, or rolled. However, embodiments of the present inventive concepts are not limited thereto. For example, in an embodiment, the substrate SUB may include a flexible material and a rigid material.

The thin-film transistor layer TFTL may include a buffer layer BF1, a light-blocking layer BML, a second buffer layer BF2, a thin-film transistor TFT, a gate insulator GI, a first interlayer dielectric layer ILD1, a capacitor electrode CPE, a second interlayer dielectric layer ILD2, a first connection electrode CNE1, a first passivation layer PAS1, a second connection electrode CNE2, a supply voltage line VDDL, and a second passivation layer PAS2.

The first buffer layer BF1 may be disposed on the substrate SUB (e.g., directly thereon in the Z direction). In an embodiment, the first buffer layer BF1 may include an inorganic film capable of preventing permeation of air or moisture. For example, the first buffer layer BF1 may include a plurality of inorganic films stacked on one another alternately. However, embodiments of the present inventive concepts are not limited thereto.

The light-blocking layer BML may be disposed on the first buffer layer BF1. For example, in an embodiment, the light-blocking layer BML may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof. However, embodiments of the present inventive concepts are not limited thereto. For example, in an embodiment, the light-blocking layer BML may be an organic layer including a black pigment.

The second buffer layer BF2 may cover the first buffer layer BF1 and the light-blocking layer BML. In an embodiment, the second buffer layer BF2 may include an inorganic film capable of preventing permeation of air or moisture. For example, the second buffer layer BF2 may include a plurality of inorganic films stacked on one another alternately.

The thin-film transistor TFT may be disposed on the second buffer layer BF2 and may form a pixel circuit of each of a plurality of pixels. For example, in an embodiment, the thin-film transistor TFT may be a driving transistor or a switching transistor of the pixel circuit. The thin-film transistor TFT may include a semiconductor region ACT, a source electrode SE, a drain electrode DE and a gate electrode GE.

The semiconductor region ACT, the source electrode SE and the drain electrode DE may be disposed on the second buffer layer BF2 (e.g., directly thereon in the Z direction). The semiconductor region ACT, the source electrode SE and the drain electrode DE may overlap with the light-blocking layer BML in the thickness direction (e.g., the Z direction). The semiconductor region ACT may overlap the gate electrode GE in the thickness direction (e.g., the Z direction) and may be insulated from the gate electrode GE by the gate insulator GI. The source electrode SE and the drain electrode DE may be formed by converting the material of the semiconductor region ACT into a conductor. The source electrode SE and the drain electrode DE may be disposed on opposite lateral sides of the semiconductor region ACT.

The gate electrode GE may be disposed on the gate insulator GI (e.g., directly thereon in the Z direction). The gate electrode GE may overlap the semiconductor region ACT with the gate insulator GI interposed therebetween.

The gate insulator GI may be disposed on the semiconductor region ACT, the source electrode SE and the drain electrode DE. For example, the gate insulator GI may cover the semiconductor region ACT, the source electrode SE, the drain electrode DE and the second buffer layer BF2, and may insulate the semiconductor region ACT from the gate electrode GE. The gate insulator GI may include a contact hole through which the first connection electrode CNE1 passes therethrough.

The first interlayer dielectric layer ILD1 may cover the gate electrode GE and the gate insulator GI. The first interlayer dielectric layer ILD1 may include a contact hole through which the first connection electrode CNE1 passes therethrough. The contact hole of the first interlayer dielectric layer ILD1 may be connected to the contact hole of the gate insulator GI and the contact hole of the second interlayer dielectric layer ILD2.

The capacitor electrode CPE may be disposed on the first interlayer dielectric layer ILD1 (e.g., directly thereon in the Z direction). The capacitor electrode CPE may overlap with the gate electrode GE in the thickness direction (e.g., the Z direction).

The second interlayer dielectric layer ILD2 may cover the capacitor electrode CPE and the first interlayer dielectric layer ILD1. The second interlayer dielectric layer ILD2 may include a contact hole through which the first connection electrode CNE1 passes therethrough. The contact hole of the second interlayer dielectric layer ILD2 may be connected to the contact hole of the first interlayer dielectric layer ILD1 and the contact hole of the gate insulating layer GI.

The first connection electrode CNE1 may be disposed on the second interlayer dielectric layer ILD2 (e.g., directly thereon in the Z direction). The first connection electrode CNE1 may connect the drain electrode DE of the thin-film transistor TFT with the second connection electrode CNE2. As shown in the embodiment of FIG. 7, the first connection electrode CNE1 may be extend through a contact hole formed in the second interlayer dielectric layer ILD2, the first interlayer dielectric layer ILD1, and the gate insulator GI to directly contact the drain electrode DE of the thin-film transistor TFT.

The first passivation layer PAS1 may cover the first connection electrode CNE1 and the second interlayer dielectric layer ILD2. The first passivation layer PAS1 can protect the thin-film transistor TFT. The first passivation layer PAS1 may include a contact hole through which the second connection electrode CNE2 passes.

The second connection electrode CNE2 may be disposed on the first passivation layer PAS1 (e.g., directly thereon in the Z direction). The second connection electrode CNE2 may connect the first connection electrode CNE1 with a pixel electrode AND of a light-emitting diode ED. The second connection electrode CNE2 may extend through a contact hole formed in the first passivation layer PAS1 to directly contact the first connection electrode CNE1.

The driving voltage line VDDL may be disposed on the first passivation layer PAS1 (e.g., directly thereon in the Z direction) to be spaced apart from the second connection electrode CNE2. The driving voltage line VDDL may receive a driving voltage in the first mode, and the driving voltage line VDDL may supply the driving voltage to each of the plurality of pixels. In an embodiment, the driving voltage may be a high-level voltage for driving a plurality of pixels. Accordingly, the display device 10 may display images in the first mode.

The driving voltage line VDDL may be grounded to a certain predetermined voltage or the earth in the second mode. The grounded driving voltage line VDDL is disposed between the gate lines GL and the touch sensing unit TSU, thereby reducing or preventing the formation of coupling capacitance between the gate lines GL and the sensing electrode RE. For example, the grounded driving voltage line VDDL may be disposed above the gate lines GL (e.g., in the Z direction) and below the touch sensing unit TSU (e.g., in the Z direction). The grounded driving voltage line VDDL is disposed between the data line DL and the touch sensing unit TSU, thereby reducing or preventing the formation of coupling capacitance between the data line DL and the sensing electrode RE. For example, the grounded driving voltage line VDDL may be disposed above the data lines DL (e.g., in the Z direction) and below the touch sensing unit TSU (e.g., in the Z direction).

The second passivation layer PAS2 may cover the second connection electrode CNE2, the driving voltage line VDDL, and the first passivation layer PAS1. The second passivation PAS2 may include a contact hole through which the pixel electrode AND of the light-emitting diode ED passes therethrough to directly contact the second connection electrode CNE2.

The emission material layer EML may be disposed on the thin-film transistor layer TFTL. The emission material layer EML may include a light-emitting diode ED and a pixel-defining layer PDL. The light-emitting diode ED may include the anode electrode AND, the emissive layer EL, and a cathode electrode CAT.

The pixel electrode AND may be disposed on the second passivation layer PAS2 (e.g., directly thereon in the Z direction). The pixel electrode AND may be disposed to overlap (e.g., in the Z direction) with one of the first to third emission areas EA1, EA2 and EA3 defined by the pixel-defining layer PDL. The pixel electrode AND may be connected to the drain electrode DE of the thin-film transistor TFT through the first and second connection electrodes CNE1 and CNE2.

The emissive layer EL may be disposed on the pixel electrode AND (e.g., directly thereon in the Z direction). For example, in an embodiment, the emissive layer EL may be an organic emissive layer made of an organic material. However, embodiments of the present inventive concepts are not limited thereto. In an embodiment in which the emissive layer EL is an organic emissive layer, when the thin-film transistor applies a predetermined voltage to the pixel electrode AND of the light-emitting diode ED and the common electrode CAT of the light-emitting diode ED receives a common voltage or cathode voltage, the holes and electrons may move to the organic emissive layer EL through the hole transporting layer and the electron transporting layer, respectively, and they combine in the organic layer E to emit light.

The common electrode CAT may be disposed on the emissive layer EL. For example, the common electrode CAT may be disposed on a pixel-defining layer PDL and the emissive layer EL and may extend to a plurality of pixels to provide an electrode common to all pixels, instead of being disposed as a separated electrode for each of the pixels. The common electrode CAT may be disposed on the emissive layer EL in the first to third emission areas EA1, EA2 and EA3, and may be disposed on the pixel-defining layer PDL in the other areas than the first to third emission areas EA1, EA2 and EA3.

The common electrode CAT may receive a common voltage or a low-level voltage in the first mode. When the pixel electrode AND receives the voltage equal to the data voltage and the common electrode CAT receives the low-level voltage, a potential difference is formed between the pixel electrode AND and the common electrode CAT, so that the organic emissive layer EL can emit light. Accordingly, the display device 10 can display images in the first mode.

The common electrode CAT may be grounded to a certain predetermined voltage or the earth in the second mode. The grounded common electrode CAT is disposed between the gate lines GL and the touch sensing unit TSU, thereby reducing or preventing the coupling capacitance between the gate lines GL and the sensing electrodes RE. For example, the common electrode CAT may be disposed above the gate line GL (e.g., in the Z direction) and below the touch sensing unit TSU (e.g., in the Z direction). The grounded common electrode CAT is disposed between the data lines DL and the touch sensing unit TSU, thereby reducing or preventing the formation of coupling capacitance between the data lines DL and the sensing electrodes RE. For example, the common electrode CAT may be disposed above the data lines DL and below the touch sensing unit TSU. Accordingly, the display device 10 can detect the point where the film quality of the common electrode CAT is degraded by detecting the coupling capacitance between the display unit DU and the touch sensing unit TSU in the second mode.

In an embodiment, the pixel-defining layer PDL may define first to third emission areas EA1, EA2 and EA3. The pixel-defining layer PDL may separate and insulate the pixel electrode AND of one of the plurality of light-emitting diodes ED from the pixel electrode of another one of the light-emitting diodes ED. The pixel-defining layer PDL may be disposed on an upper surface of the second passivation layer PAS2 and lateral ends of the pixel electrode AND defining emission areas in the exposed central portion of the pixel electrode AND having the emissive layer EL disposed thereon.

The encapsulation layer TFEL may be disposed on the common electrode CAT (e.g., directly thereon in the Z direction) to cover the light-emitting diodes ED. In an embodiment, the encapsulation layer TFEL may include at least one inorganic layer to prevent permeation of oxygen or moisture into the emission material layer EML. The encapsulation layer TFEL may include at least one organic layer to protect the emission material layer EML from foreign substances such as dust.

The touch sensing unit TSU may be disposed on the encapsulation layer TFEL. For example, as shown in the embodiment of FIG. 7, the touch sensing unit TSU may be disposed directly on the encapsulation layer TFEL (e.g., in the Z direction). However, embodiments of the present inventive concepts are not limited thereto. As shown in the embodiment of FIG. 7, the touch sensing unit TSU may include a third buffer layer BF3, a bridge electrode CE, a first insulating layer SIL1, a driving electrode TE, a sensing electrode RE, and a second insulating layer SIL2.

The third buffer layer BF3 may be disposed on the encapsulation layer TFEL (e.g., directly thereon in the Z direction). The third buffer layer BF3 may have insulating and optical functionalities. The third buffer layer BF3 may include at least one inorganic layer. However, embodiments of the present inventive concepts are not limited thereto. For example, in an embodiment, the third buffer layer BF3 may be eliminated.

The bridge electrode CE may be disposed on the third buffer layer BF3 (e.g., directly thereon in the Z direction). The bridge electrode CE may be disposed on a different layer from the driving electrode TE and the sensing electrode RE, and may connect between the driving electrodes TE adjacent to one another in the Y direction.

The first insulating layer SIL1 may cover the bridge electrode CE and the third buffer layer BF3. The first insulating layer SIL1 may have insulating and optical functionalities. For example, in an embodiment, the first insulating layer SIL1 may be an inorganic layer including at least one inorganic layer selected from the group consisting of: a silicon nitride layer, a silicon oxynitride layer, a silicon oxide layer, a titanium oxide layer and an aluminum oxide layer.

The driving electrode TE and the sensing electrode RE may be disposed on the first insulating layer SIL1 (e.g., directly thereon in the Z direction). In an embodiment, each of the driving electrode TE and the sensing electrode RE may overlap with none of the first to third emission areas EA1, EA2 and EA3. In an embodiment, each of the driving electrodes TE and the sensing electrodes RE may be made up of a single layer of molybdenum (Mo), titanium (Ti), copper (Cu) or aluminum (Al), or may be made up of a stack structure of aluminum and titanium (Ti/Al/Ti), a stack structure of aluminum and ITO (ITO/Al/ITO), an APC alloy, or a stack structure of an APC alloy and ITO (ITO/APC/ITO). However, embodiments of the present inventive concepts are not limited thereto and the materials of the driving electrodes TE and the sensing electrodes RE may vary.

The second insulating layer SIL2 may cover the driving electrode TE, the sensing electrode RE and the first insulating layer SIL1. The second insulating layer SIL2 may have insulating and optical functionalities. In an embodiment, the second insulating layer SIL2 may be made of one of the same above-listed materials as the material of the first insulating layer SIL1.

Figure 8:
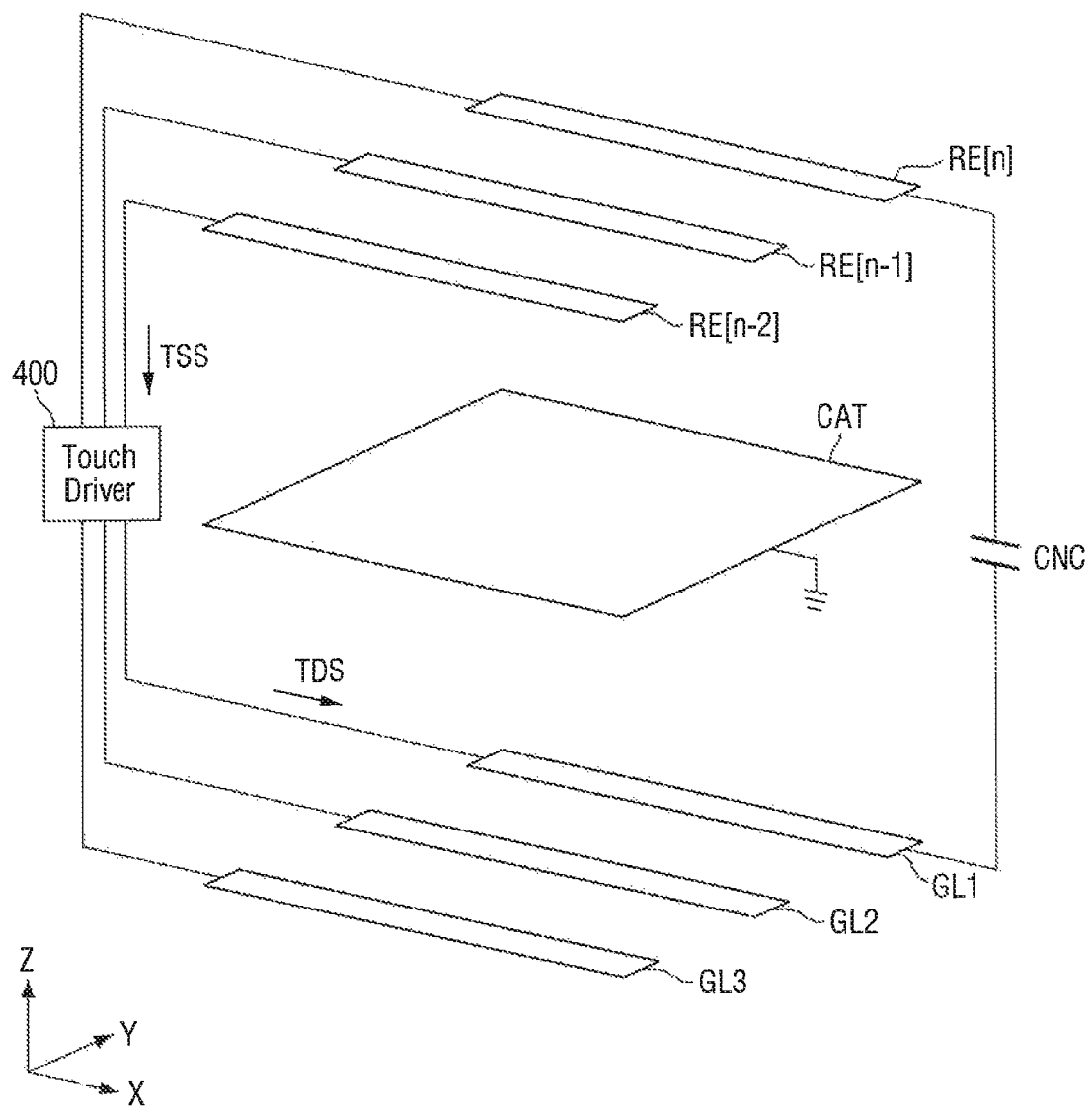
FIG. 8 is a schematic view showing an example of measuring noise capacitance in a display device according to an embodiment of the present inventive concepts.

FIG. 8 is a schematic view showing an example of measuring noise capacitance in a display device according to an embodiment.

Referring to the embodiment of FIG. 8, the display device 10 may detect the coupling capacitance CNC between the plurality of gate lines GL and the plurality of sensing electrodes RE in a second mode. Herein, the second mode may be a coupling-noise sensing mode of the display device 10.

The touch driver 400 may supply a touch driving signal TDS to the gate driver 210 through the third touch pads TP3 and the gate control line GCL in the second mode. Herein, the touch driving signal TDS may be a pulse signal having a predetermined frequency. In an embodiment, the touch driver 400 may sequentially supply the touch driving signal TDS to the first to third gate lines GL1, GL2 and GL3 in a predetermined order. While the embodiment of FIG. 8 shows the gate line GL including three gate lines comprising first to third gate lines GL1, GL2 and GL3, the number of gate lines of the gate line GL may vary.

The touch driver 400 may receive a touch sensing signal TSS from the plurality of sensing electrodes RE of the touch sensing unit TSU. For example, as shown in the embodiment of FIG. 8, the touch driver 400 may receive the touch sensing signal TSS from the $n^{th}$ sensing electrode RE[n], the $(n-1)^{th}$ sensing electrode RE[n−1] and the $(n-2)^{th}$ sensing electrode RE[n−2], where n is a positive integer, so that it can sense a change in the mutual capacitance between the gate lines GL and the sensing electrodes RE. However, embodiments of the present inventive concepts are not limited thereto and the number of the plurality of sensing electrodes RE may vary. Accordingly, the touch driver 400 may detect the coupling capacitance CNC between the plurality of gate lines GL and the plurality of sensing electrodes RE.

The common electrode CAT may be grounded to a certain predetermined voltage or the earth in the second mode. The grounded common electrode CAT is disposed between the gate lines GL and the touch sensing unit TSU, thereby reducing or preventing the coupling capacitance CNC between the gate lines GL and the sensing electrodes RE. Accordingly, the display device 10 can detect the point where the film quality of the common electrode CAT is degraded by detecting the coupling capacitance CNC between the display unit DU and the touch sensing unit TSU. As shown in the embodiment of FIG. 8, when the coupling capacitance CNC between the first gate line GL1 and the $n^{th}$ sensing electrode RE[n] is relatively small, the display device 10 may determine that the film quality of the common electrode CAT between the first gate line GL1 and the $n^{th}$ sensing electrode RE[n] is high.

Figure 9:
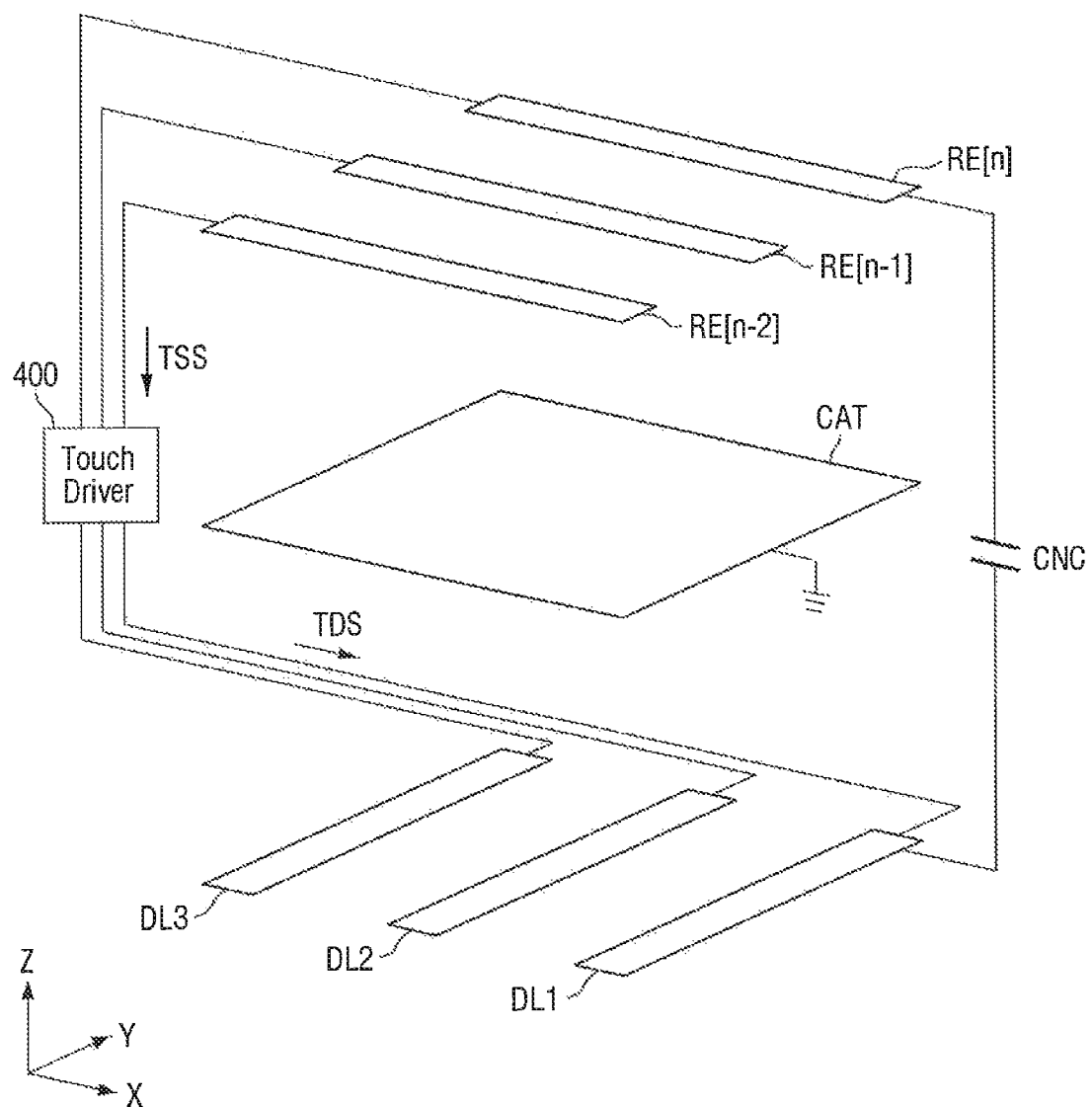
FIG. 9 is a schematic view showing another example of measuring noise capacitance in a display device according to an embodiment of the present inventive concepts.

FIG. 9 is a schematic view showing another example of measuring noise capacitance in a display device according to an embodiment.

Referring to the embodiment of FIG. 9, the display device 10 may detect the coupling capacitance CNC between the plurality of data lines DL and the plurality of sensing electrodes RE in the second mode.

The touch driver 400 may supply a touch driving signal TDS to the plurality of data lines DL through the third touch pads TP3 in the second mode. Herein, the touch driving signal TDS may be a pulse signal having a predetermined frequency. In an embodiment, the touch driver 400 may sequentially supply the touch driving signal TDS to the first to third data lines DL1, DL2 and DL3 in a predetermined order. While the embodiment of FIG. 9 shows the plurality of data lines DL including three data lines comprising the first to third data lines DL1, DL2 and DL3, the number of data lines may vary.

The touch driver 400 may receive a touch sensing signal TSS from the plurality of sensing electrodes RE of the touch sensing unit TSU. For example, as shown in the embodiment of FIG. 9, the touch driver 400 may receive the touch sensing signal TSS from the $n^{th}$ sensing electrode RE[n], the $(n-1)^{th}$ sensing electrode RE[n−1] and the $(n-2)^{th}$ sensing electrode RE[n−2], where n is a positive integer, so that it can sense a change in the mutual capacitance between the data lines DL and the sensing electrodes RE. However, embodiments of the present inventive concepts are not limited thereto and the number of the plurality of sensing electrodes RE may vary. Accordingly, the touch driver 400 may detect the coupling capacitance CNC between the plurality of data lines DL and the plurality of sensing electrodes RE.

The common electrode CAT may be grounded to a certain predetermined voltage or the earth in the second mode. The grounded common electrode CAT is disposed between the data lines DL and the touch sensing unit TSU, thereby reducing or preventing the coupling capacitance CNC between the data lines DL and the sensing electrodes RE. Accordingly, the display device 10 can detect the point where the film quality of the common electrode CAT is degraded by detecting the coupling capacitance CNC between the display unit DU and the touch sensing unit TSU. As shown in the embodiment of FIG. 9, when the coupling capacitance CNC between the first data line DL1 and the $n^{th}$ sensing electrode RE[n] is relatively small, the display device 10 may determine that the film quality of the common electrode CAT between the first data line DL1 and the $n^{th}$ sensing electrode RE[n] is high.

Figure 10:
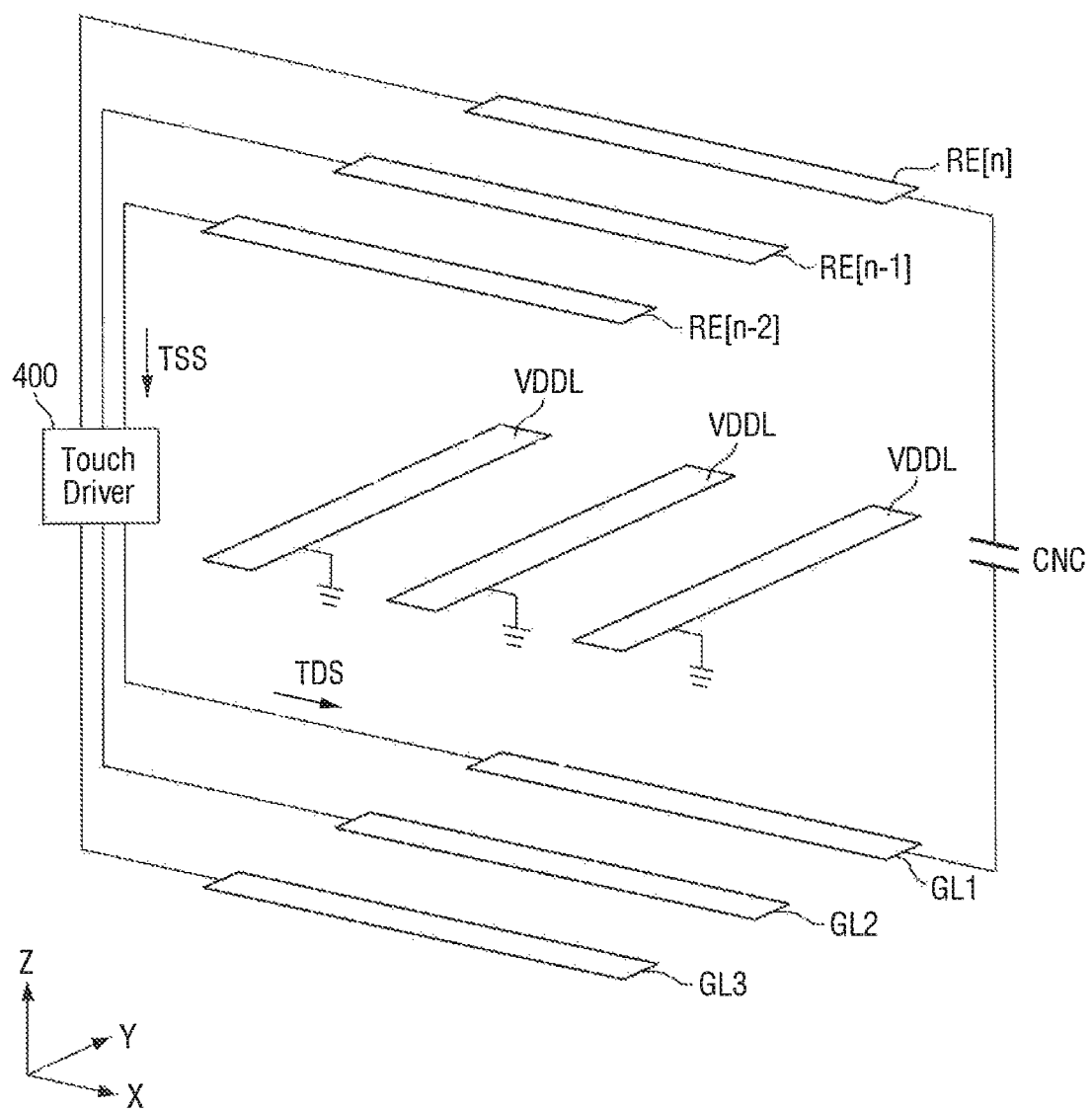
FIG. 10 is a schematic view showing yet another example of measuring noise capacitance in a display device according to an embodiment of the present inventive concepts.

FIG. 10 is a schematic view showing yet another example of measuring noise capacitance in a display device according to an embodiment.

Referring to the embodiment of FIG. 10, the display device 10 may detect the coupling capacitance CNC between the plurality of gate lines GL and the plurality of sensing electrodes RE in the second mode. Herein, the second mode may be a coupling-noise sensing mode of the display device 10.

The touch driver 400 may supply a touch driving signal TDS to the gate driver 210 through the third touch pads TP3 and the gate control line GCL in the second mode. Herein, the touch driving signal TDS may be a pulse signal having a predetermined frequency. In an embodiment, the touch driver 400 may sequentially supply the touch driving signal TDS to the first to third gate lines GL1, GL2 and GL3 in a predetermined order.

The touch driver 400 may receive a touch sensing signal TSS from the plurality of sensing electrodes RE of the touch sensing unit TSU. For example, as shown in the embodiment of FIG. 10, the touch driver 400 may receive the touch sensing signal TSS from the $n^{th}$ sensing electrode RE[n], the $(n-1)^{th}$ sensing electrode RE[n−1] and the $(n-2)^{th}$ sensing electrode RE[n−2], where n is a positive integer, so that it can sense a change in the mutual capacitance between the gate lines GL and the sensing electrodes RE. Accordingly, the touch driver 400 may detect the coupling capacitance CNC between the plurality of gate lines GL and the plurality of sensing electrodes RE.

The driving voltage line VDDL may be grounded to a certain predetermined voltage or the earth in the second mode. The grounded driving voltage line VDDL is disposed between the gate line GL and the touch sensing unit TSU, thereby reducing or preventing the coupling capacitance CNC between the gate lines GL and the sensing electrodes RE. Accordingly, the display device 10 can detect the point where the film quality of the driving voltage line VDDL is degraded by detecting the coupling capacitance CNC between the display unit DU and the touch sensing unit TSU. As shown in the embodiment of FIG. 10, when the coupling capacitance CNC between the first gate line GL1 and the $n^{th}$ sensing electrode RE[n] is relatively small, it may be determined that the film quality of the driving voltage line VDDL between the first gate line GL1 and the $n^{th}$ sensing electrode RE[n] is high.

Figure 11:
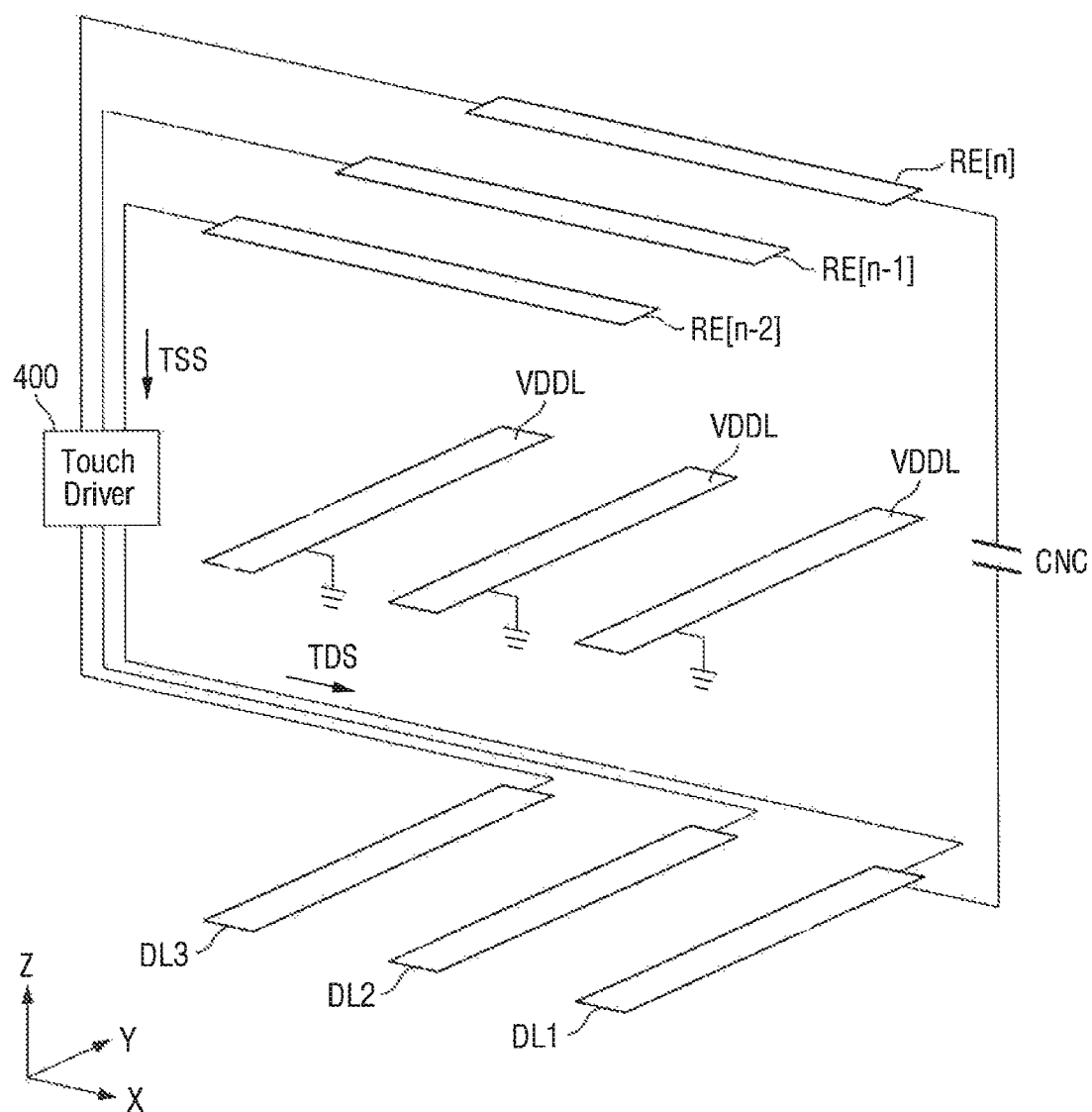
FIG. 11 is a schematic view showing yet another example of measuring noise capacitance in a display device according to an embodiment of the present inventive concepts.

FIG. 11 is a schematic view showing yet another example of measuring noise capacitance in a display device according to an embodiment.

Referring to the embodiment of FIG. 11, the display device 10 may detect the coupling capacitance CNC between the plurality of data lines DL and the plurality of sensing electrodes RE in the second mode.

The touch driver 400 may supply a touch driving signal TDS to the plurality of data lines DL through the third touch pads TP3 in the second mode. Herein, the touch driving signal TDS may be a pulse signal having a predetermined frequency. In an embodiment, the touch driver 400 may sequentially supply the touch driving signal TDS to the first to third data lines DL1, DL2 and DL3 in a predetermined order.

The touch driver 400 may receive a touch sensing signal TSS from the plurality of sensing electrodes RE of the touch sensing unit TSU. For example, as shown in the embodiment of FIG. 11, the touch driver 400 may receive the touch sensing signal TSS from the $n^{th}$ sensing electrode RE[n], the $(n-1)^{th}$ sensing electrode RE[n−1] and the $(n-2)^{th}$ sensing electrode RE[n−2], where n is a positive integer, so that it can sense a change in the mutual capacitance between the data lines DL and the sensing electrodes RE. Accordingly, the touch driver 400 may detect the coupling capacitance CNC between the plurality of data lines DL and the plurality of sensing electrodes RE.

The driving voltage line VDDL may be grounded to a certain predetermined voltage or the earth in the second mode. The grounded driving voltage line VDDL is disposed between the data line DL and the touch sensing unit TSU, thereby reducing or preventing the coupling capacitance CNC between the data line DL and the sensing electrode RE. Accordingly, the display device 10 can detect the point where the film quality of the driving voltage line VDDL is degraded by detecting the coupling capacitance CNC between the display unit DU and the touch sensing unit TSU. As shown in the embodiment of FIG. 11, when the coupling capacitance CNC between the first data line DL1 and the $n^{th}$ sensing electrode RE[n] is relatively small, it may be determined that the film quality of the driving voltage line VDDL between the first data line DL1 and the $n^{th}$ sensing electrode RE[n] is high.

Figure 12:
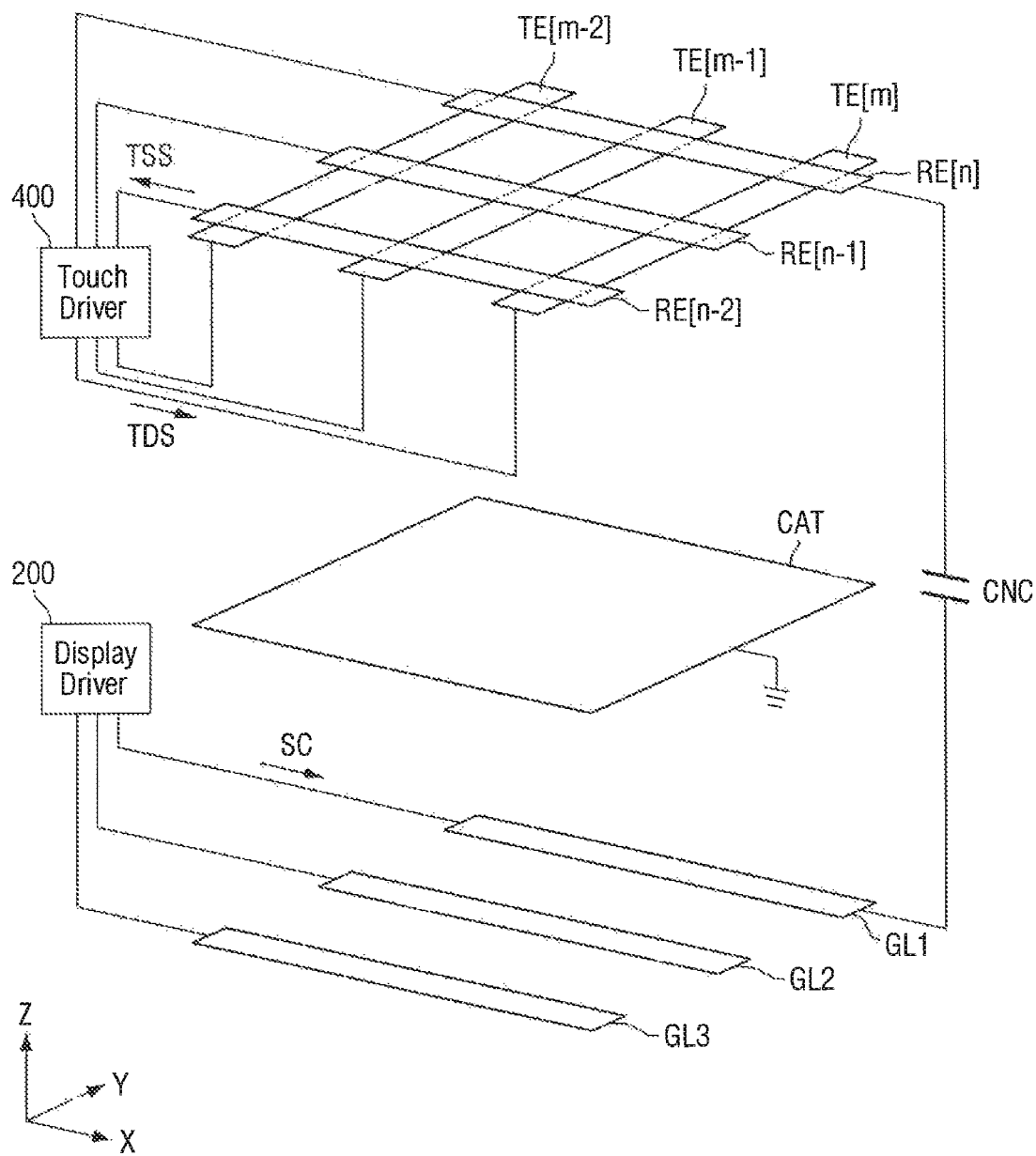
FIG. 12 is a schematic view showing still another example of measuring noise capacitance in a display device according to an embodiment of the present inventive concepts.

FIG. 12 is a schematic view showing still another example of measuring noise capacitance in a display device according to an embodiment.

Referring to the embodiment of FIG. 12, the display device 10 can sense a change in mutual capacitance between the plurality of driving electrodes TE and the plurality of sensing electrodes RE in a third mode. Herein, the third mode may be a noise-detecting mode of the touch sensing unit TSU based on a source signal SC of the display unit DU. For example, as shown in the embodiment of FIG. 12, the display device 10 may supply the source signal SC to the display unit DU, and can detect a change in the capacitance between the driving electrodes TE and the sensing electrodes RE by the coupling capacitor CNC between the display unit DU and the touch sensing unit TSU.

The display driver 200 may supply the source signal SC to the plurality of gate lines GL, such as the first to third gate lines GL1, GL2, GL3, through the first fan-out lines FOL1 in the third mode. For example, in an embodiment, the source signal SC may be at least one of a sine wave signal, a square wave signal, a pulse signal, a ramp wave signal, and a Gaussian noise signal. However, embodiments of the present inventive concepts are not limited thereto.

The first switching element SW1 may connect the first fan-out lines FOL1 to a gate control line GCL in the third mode. Accordingly, the display driver 200 may supply a source signal SC to the gate driver 210 through the gate control line GCL in the third mode. In an embodiment, the gate driver 210 may sequentially supply a plurality of source signals SC to the first to third gate lines GL1, GL2 and GL3 in a predetermined order.

The touch driver 400 may supply a touch driving signal TDS to the plurality of driving electrodes TE through the plurality of first touch pads TP1 and the driving lines TL in the third mode. Herein, the touch driving signal TDS may be a pulse signal having a predetermined frequency. For example, as shown in the embodiment of FIG. 12, the touch driver 400 may supply the touch driving signal TDS in a predetermined order to the $m^{th}$ driving electrode TE[m], the $(m-1)^{th}$ driving electrode TE[m-1], and the $(m-2)^{th}$ driving electrode TE[m-2], where m is a positive integer.

The touch driver 400 may receive a touch sensing signal TSS from the plurality of sensing electrodes RE in the third mode. For example, as shown in the embodiment of FIG. 12, the touch driver 400 may receive the touch sensing signal TSS from the $n^{th}$ sensing electrode RE[n], the $(n-1)^{th}$ sensing electrode RE[n-1] and the $(n-2)^{th}$ sensing electrode RE[n-2], where n is a positive integer, so that it can sense a change in the mutual capacitance between the driving electrodes TE and the sensing electrodes RE. Accordingly, the touch driver 400 can detect a change in the capacitance between the driving electrodes TE and the sensing electrode RE by the coupling capacitance CNC between the plurality of gate lines GL and the plurality of sensing electrodes RE.

The common electrode CAT may be grounded to a certain predetermined voltage or the earth in the third mode. The grounded common electrode CAT is disposed between the gate lines GL and the touch sensing unit TSU, thereby reducing or preventing the coupling capacitance CNC between the gate lines GL and the sensing electrodes RE. Accordingly, by detecting a point where the capacitance between the driving electrodes TE and the sensing electrodes RE is affected by the coupling capacitance CNC between the display unit DU and the touch sensing unit TSU, the display device 10 can detect the point where the film quality of the common electrode CAT is degraded. As shown in the embodiment of FIG. 12, when the capacitance between the $m^{th}$ driving electrode TE[m] and the $n^{th}$ sensing electrode RE[n] is not affected by the coupling capacitance CNC, the display device 10 may determine that the film quality of the common electrode CAT between the point where the $m^{th}$ driving electrode TE[m] and the $n^{th}$ sensing electrode RE[n] are adjacent to each other and the display unit DU is high.

Figure 13:
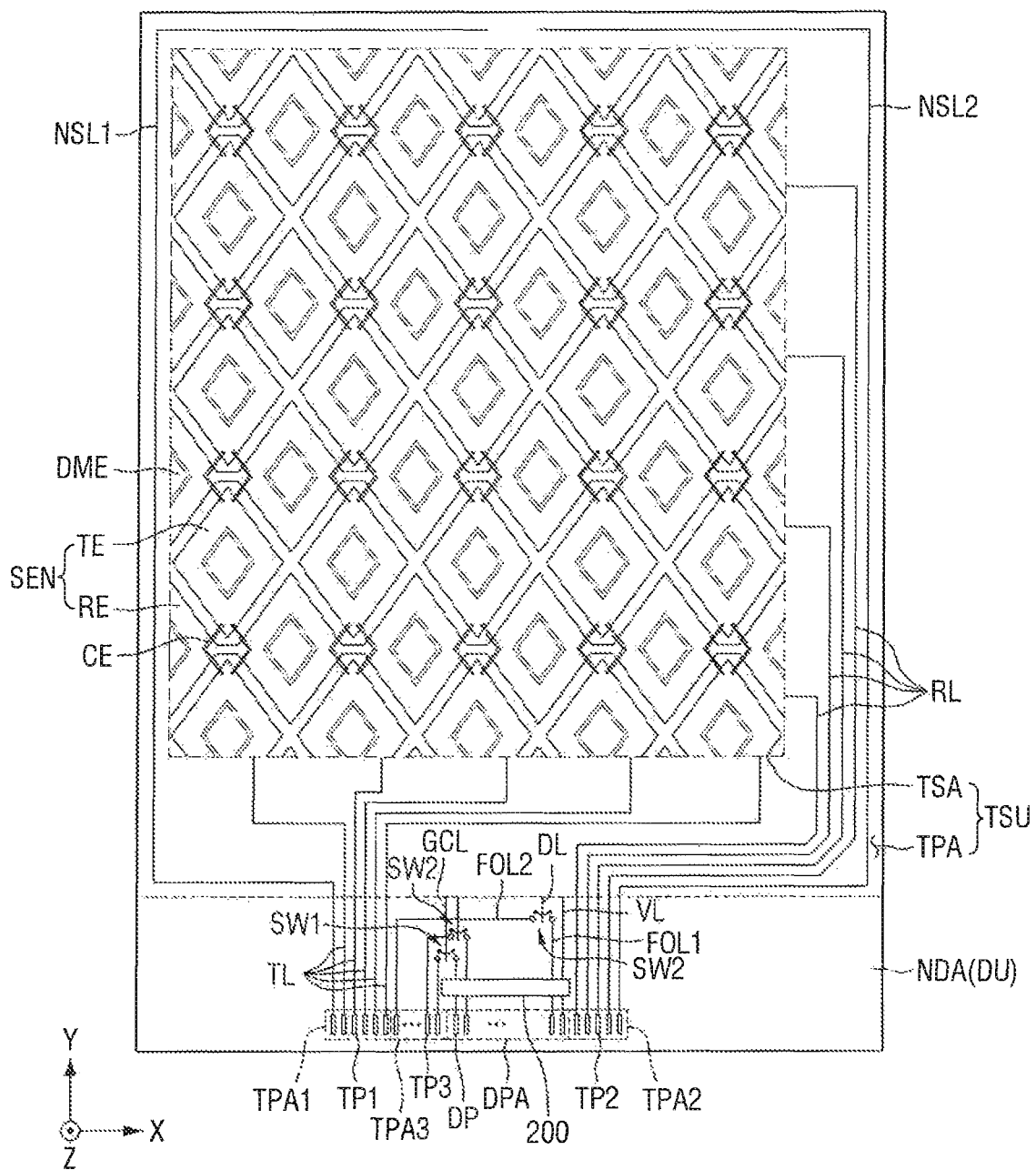
FIG. 13 is a plan view showing a touch sensing unit of a display device according to an embodiment of the present inventive concepts.

FIG. 13 is a plan view showing a touch sensing unit of a display device according to an embodiment of the present inventive concepts. The touch sensing unit of FIG. 13 is substantially identical to the touch sensing unit of FIG. 4 except that the former further includes a noise sensing line. Therefore, a redundant descriptions of substantially similar or identical elements may be omitted for convenience of explanation.

Referring to FIG. 13, the touch sensing unit TSU may include a touch sensor area TSA that senses a user's touch, and a touch peripheral area TPA disposed around the touch sensor area TSA (e.g., in the X and Y directions). The touch sensor area TSA may overlap the display area DA of the display panel 100, and the touch peripheral area TPA may overlap the non-display area NDA of the display panel 100.

The touch sensor area TSA may include a plurality of touch electrodes SEN and a plurality of dummy electrodes DME. In an embodiment, the plurality of touch electrodes SEN may form mutual capacitance or self capacitance to sense a touch of an object or person. As shown in the embodiment of FIG. 13, the plurality of touch electrodes SEN may include a plurality of driving electrodes TE and a plurality of sensing electrodes RE.

The touch peripheral area TPA may include a plurality of driving lines TL, a plurality of sensing lines RL, and a noise sensing line, such as first and second noise sensing lines NSL1, NSL2.

The plurality of driving lines TL may connect the plurality of driving electrodes TE with the first touch pads TP1. The plurality of driving lines TL may extend to the first touch pads TP1 through the lower side of the touch peripheral area TPA and the non-display area NDA.

The plurality of sensing lines RL may connect the plurality of sensing electrodes RE with the second touch pads TP2. As shown in the embodiment of FIG. 13, a plurality of sensing lines RL may extend to the second touch pads TP2 through the right side of the touch peripheral area TPA and the non-display area NDA. However, embodiments of the present inventive concepts are not limited thereto.

In an embodiment, the noise sensing line may be disposed at the outermost position of the touch sensing unit TSU. For example, the noise sensing line, such as the first and second noise sensing lines NSL1 and NSL2 may extend along the borders of the plurality of driving electrodes TE and the plurality of sensing electrodes RE and may be positioned adjacent to edges of the display device. While the embodiment of FIG. 13 shows the noise sensing line including first and second noise sensing lines NSL1 and NSL2, the number of lines of the noise sensing line may vary.

As shown in the embodiment of FIG. 13, the first noise sensing line NSL1 may extend along one edge of the touch peripheral area TPA. For example, the first noise sensing line NSL1 may extend from the upper edge of the touch peripheral area TPA to the first touch pads TP1 through the left edge (e.g., in the X direction) and the lower edge (e.g., in the Y direction). The first noise sensing line NSL1 may be connected to the touch driver 400 through the circuit board 300.

In an embodiment, the second noise sensing line NSL2 may extend along the opposite edge of the touch peripheral area TPA. For example, the second noise sensing line NSL2 may extend from the upper edge of the touch peripheral area TPA to the second touch pads TP2 through the right edge and the lower edge. The second noise sensing line NSL2 may be connected to the touch driver 400 through the circuit board 300.

The touch driver 400 may supply touch driving signals to the gate lines GL in the second mode and may receive touch sensing signals from the first and second noise sensing lines NSL1 and NSL2. The touch driver 400 may supply touch driving signals to the gate lines GL through the third touch pads TP3 and the second fan-out lines FOL2 in the second mode. The touch driver 400 may receive touch sensing signals through the sensing lines RL and the second touch pads TP2. In the second mode, the touch driver 400 senses a change in the mutual capacitance between the gate lines GL of the display unit DU and the first and second noise sensing lines NSL1 and NSL2 disposed at the outermost positions of the touch sensing unit TSU, to detect the coupling capacitance between the display unit DU and the edge of the touch sensing unit TSU.

The common electrode CAT may be grounded to a certain predetermined voltage or the earth in the second mode. The grounded common electrode CAT is disposed between the gate lines GL and the touch sensing unit TSU, thereby reducing or preventing the coupling capacitance between the gate lines GL and the first and second noise sensing lines NSL1 and NSL2. Accordingly, the display device 10 can detect the point where the film quality of the edge of the common electrode CAT is degraded by detecting the coupling capacitance between the display unit DU and the edges of the touch sensing unit TSU in the second mode.

Figure 14:
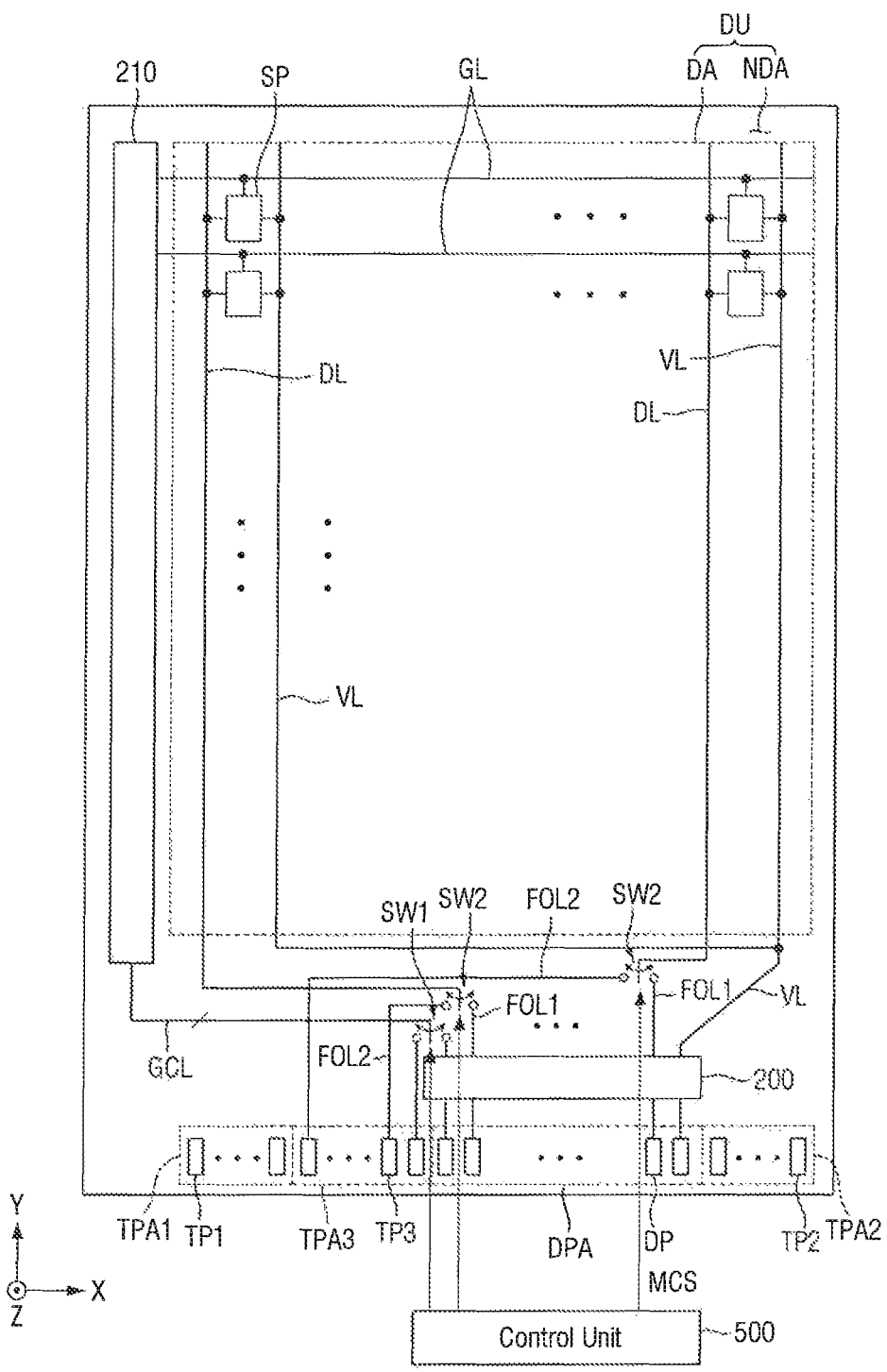
FIG. 14 is a plan view showing a display unit and a control unit of a display device according to an embodiment of the present inventive concepts.

FIG. 14 is a view showing a display unit and a control unit of a display device according to an embodiment of the present inventive concepts. The display device of FIG. 14 is substantially identical to the display device of FIG. 3 except that the former further includes a control unit. Therefore, a redundant description of substantially similar or identical elements may be omitted for convenience of explanation.

Referring to FIG. 14, a display device 10 may further include a control unit 500.

As shown in the embodiment of FIG. 14, the control unit 500 may supply a mode control signal MCS to the first and second switching elements SW1 and SW2. The control unit 500 may supply the mode control signal MCS to the first switching element SW1 to selectively connect the first switching element SW1 to one of the first fan-out line FOL1 and the second fan-out line FOL2. The control unit 500 may supply the mode control signal MCS to the second switching element SW2 to connect the second switching element SW2 to one of the first fan-out line FOL1 and the second fan-out line FOL2. The control unit 500 may connect the first switching element SW1 or the second switching element SW2 to the first fan-out line FOL1 in the first mode. The control unit 500 may connect the first switching element SW1 or the second switching element SW2 to the second fan-out line FOL2 in the second mode. Accordingly, the control unit 500 may control the mode of the display device 10 on a regular cycle, at a particular time point, or pursuant to a user's command.

The control unit 500 may receive the coupling capacitance between the plurality of gate lines GL and the plurality of sensing electrodes RE from the touch driver 400 to detect the point where the film quality of the common electrode CAT is degraded. In an embodiment, the control unit 500 may apply an offset voltage or a weight to the touch sensing signal associated with a point where the film quality of the common electrode CAT is degraded. Accordingly, the control unit 500 may compensate the touch sensing signal at the point where the film quality of the common electrode CAT is degraded to generate noise compensation data. By applying the noise compensation data, the display device 10 can prevent malfunction of the touch sensing unit TSU and increase touch sensitivity.

Figure 15:
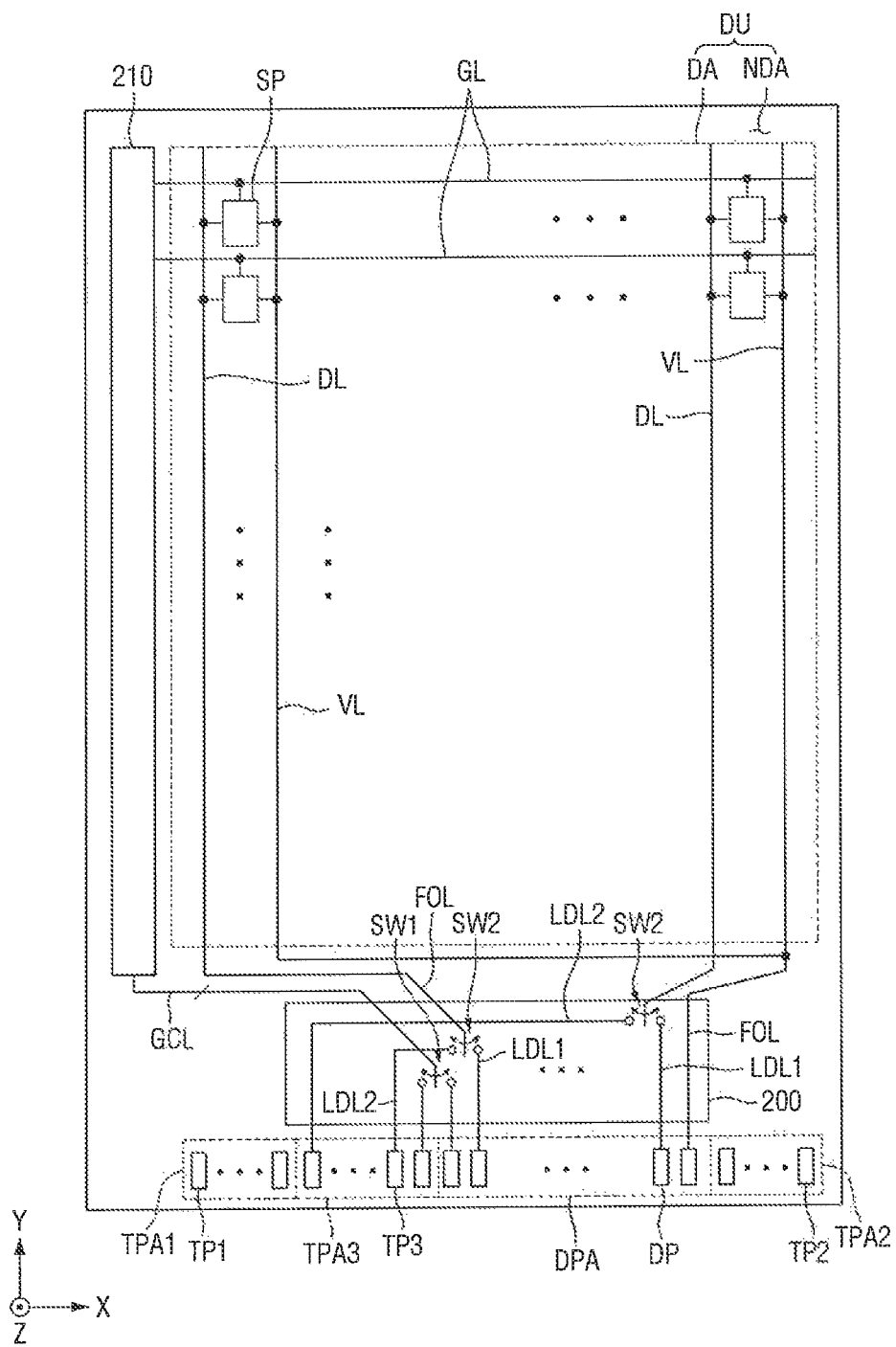
FIG. 15 is a plan view showing a display unit of a display device according to an embodiment of the present inventive concepts.
Figure 16:
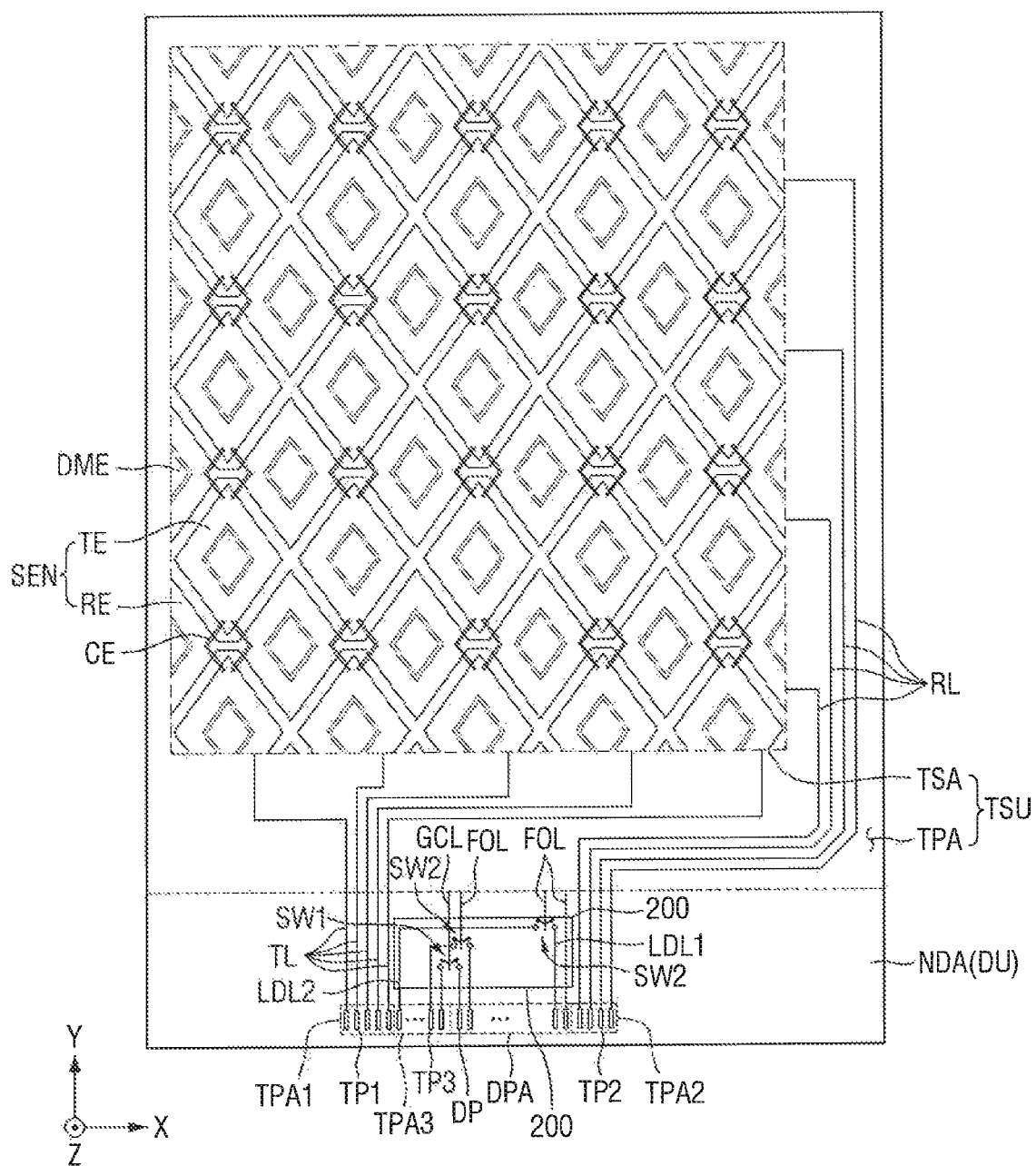
FIG. 16 is a plan view showing a touch sensing unit of a display device according to an embodiment of the present inventive concepts.

FIG. 15 is a plan view showing a display unit of a display device according to an embodiment of the present inventive concepts. FIG. 16 is a plan view showing a touch sensing unit of a display device according to an embodiment of the present inventive concepts. The display device of FIGS. 15 and 16 is substantially identical to the display device of FIGS. 3 and 4 except for the configuration of a display driver 200; and, therefore, a redundant description of substantially similar or identical elements may be omitted for convenience of explanation.

Referring to the embodiments of FIGS. 15 and 16, a display unit DU may include a display area DA and a non-display area NDA. The display area DA is an area for the displaying of images, such at least one moving or still image, and may be defined as a central area of the display panel 300 (e.g., in the X and Y direction). However, embodiments of the present inventive concepts are not limited thereto. The non-display area NDA may include a display driver 200, a gate driver 210, fan-out lines FOL, gate control lines GCL, first lead lines LDL1, second lead lines LDL2, a display pad area DPA, and first to third touch pad areas TPA1, TPA2 and TPA3.

The display driver 200 may output signals and voltages for driving the display panel 100 to the fan-out lines FOL. In an embodiment, the display driver 200 may include first and second switching elements SW1 and SW2.

The first switching element SW1 may connect the first lead lines LDL1 to the gate control line GCL in the first mode via fan-out lines FOL. Herein, the first mode may be a display mode of the display device 10. The display device 10 may display images in the first mode depending on its use. Accordingly, the display driver 200 may supply a gate control signal to the gate driver 210 through the gate control line GCL in the first mode. In an embodiment, the gate driver 210 may generate a plurality of gate signals based on the gate control signal in the first mode, and may sequentially supply the plurality of gate signals to the plurality of gate lines GL in a predetermined order.

The second switching element SW2 may connect the first lead lines LDL1 to the data lines DL in the first mode via the fan-out lines FOL. Accordingly, the display driver 200 may supply the data voltages to the plurality of pixels SP through the data lines DL in the first mode. By supplying the data voltages to the plurality of pixels SP, the luminance of the plurality of pixels SP may be determined.

The first lead lines LDL1 may extend from the display pads DP to the first switching element SW1 or the second switching element SW2. A first partial portion of the first lead lines LDL1 may be connected to the first switching element SW1 in the first mode to supply the gate control signal to the gate control line GCL. A second partial portion of the first lead lines LDL1 that is different from the first partial portion may be connected to the second switching element SW2 in the first mode to supply data voltages to the plurality of data lines DL.

The first switching element SW1 may connect the second lead lines LDL2 to the gate control line GCL in the second mode via the fan-out lines FOL. Herein, the second mode may be a coupling-noise sensing mode of the display device 10. The display device 10 may detect coupling capacitance between the display unit DU and the touch sensing unit TSU in the second mode. Accordingly, the touch driver 400 may supply a touch driving signal to the gate driver 210 through the third touch pads TP3, the second lead lines LDL2 and the gate control line GCL in the second mode. Herein, the touch driving signal may be a pulse signal having a predetermined frequency. In an embodiment, the gate driver 210 may sequentially supply the received touch driving signal to the plurality of gate lines GL in a predetermined order in the second mode. The touch driver 400 can detect the coupling capacitance between the gate line GL and the touch sensing unit TSU by receiving a touch sensing signal from the touch sensing unit TSU.

The second switching element SW2 may connect the second lead lines LDL2 to the data lines DL in the second mode via the fan-out lines FOL. Accordingly, the touch driver 400 may supply the touch driving signal to the plurality of data lines DL through the third touch pads TP3 and the second lead lines LDL2 in the second mode. The touch driver 400 can detect the coupling capacitance between the data line GL and the touch sensing unit TSU by receiving a touch sensing signal from the touch sensing unit TSU.

The second lead lines LDL2 may extend from the third touch pads TP3 to the first switching element SW1 or the second switching element SW2. A first partial portion of the second lead lines LDL2 may be connected to the first switching element SW1 in the second mode to supply the touch driving signal to the gate control line GCL. A second partial portion of the second lead lines LDL2 may be connected to the second switching element SW2 in the second mode to supply the touch driving signal to the plurality of data lines DL through the plurality of fan-out lines FOL.

Figure 17:
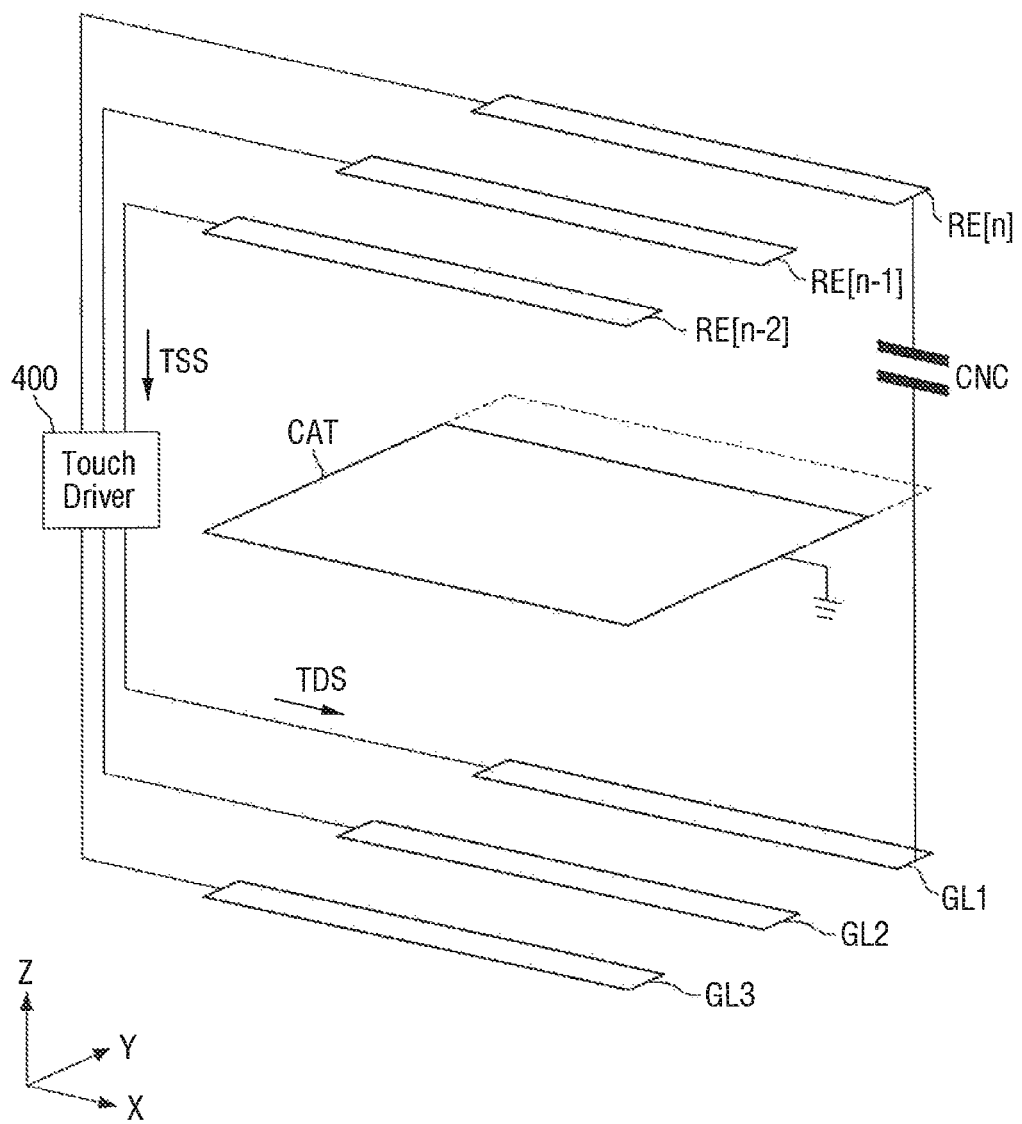
FIG. 17 is a schematic view showing measurement of noise capacitance at some points where film quality of a common electrode is degraded in a display device according to an embodiment of the present inventive concepts.

FIG. 17 is a view showing measurement of noise capacitance at some points where film quality of a common electrode is degraded in a display device according to an embodiment.

Referring to the embodiment of FIG. 17, the display device 10 may detect the coupling capacitance CNC between the plurality of gate lines GL and the plurality of sensing electrodes RE in the second mode. Herein, the second mode may be a coupling-noise sensing mode of the display device 10.

The touch driver 400 may supply a touch driving signal TDS to the gate driver 210 in the second mode. In an embodiment, the touch driver 400 may sequentially supply the touch driving signal TDS to the first to third gate lines GL1, GL2 and GL3 in a predetermined order.

The touch driver 400 may receive a touch sensing signal TSS from the plurality of sensing electrodes RE of the touch sensing unit TSU. For example, as shown in the embodiment of FIG. 17, the touch driver 400 may receive the touch sensing signal TSS from the $n^{th}$ sensing electrode RE[n], the $(n-1)^{th}$ sensing electrode RE[n-1] and the $(n-2)^{th}$ sensing electrode RE[n-2], where n is a positive integer, so that it can sense a change in the mutual capacitance between the gate lines GL and the sensing electrodes RE. Accordingly, the touch driver 400 may detect the coupling capacitance CNC between the plurality of gate lines GL and the plurality of sensing electrodes RE.

The common electrode CAT may be grounded to a certain predetermined voltage or the earth in the second mode. The grounded common electrode CAT is disposed between the gate lines GL and the touch sensing unit TSU, thereby reducing or preventing the coupling capacitance CNC between the gate lines GL and the sensing electrodes RE.

For example, the film quality of a portion of the common electrode CAT may be degraded. For example, the film quality of the common electrode CAT may be degraded if the thickness is reduced, the density thereof is decreased, or the area where the film is formed is reduced. If the film quality of the common electrode CAT is degraded, the common electrode CAT may not reduce the coupling capacitance CNC between the display unit DU and the touch sensing unit TSU. Accordingly, the coupling capacitance CNC between the display unit DU and the touch sensing unit TSU may be relatively large at some points of the common electrode CAT if the film quality is degraded. As shown in the embodiment of FIG. 17, when the coupling capacitance CNC between the first gate line GL1 and the $n^{th}$ sensing electrode RE[n] is relatively large, the display device 10 may determine that the film quality of the common electrode CAT between the first gate line GL1 and the $n^{th}$ sensing electrode RE[n] is degraded.

Figure 18:
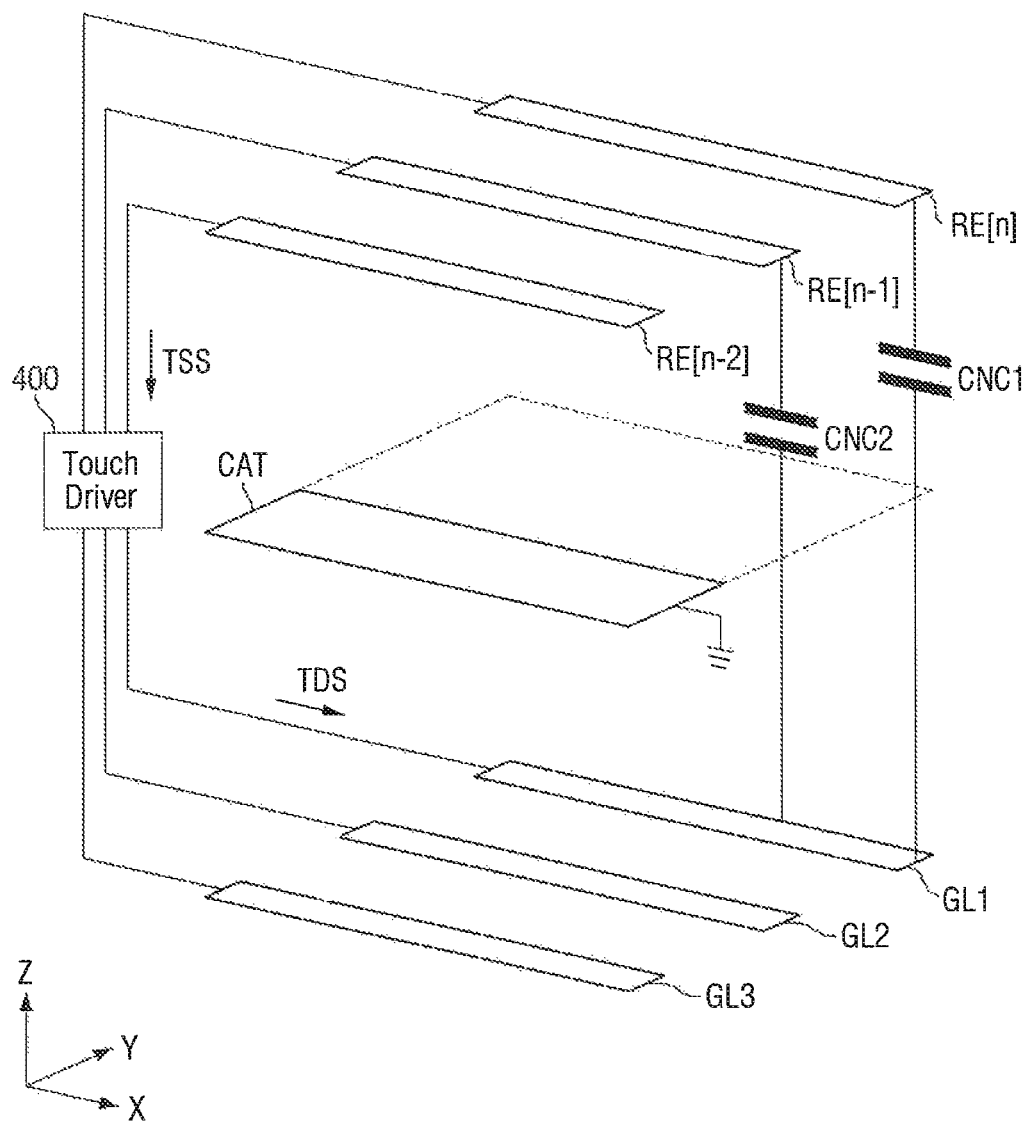
FIG. 18 is a schematic view showing measurement of noise capacitance at some other points where film quality of a common electrode is degraded in a display device according to an embodiment of the present inventive concepts.

FIG. 18 is a view showing measurement of noise capacitance at some other points where film quality of a common electrode is degraded in a display device according to an embodiment.

Referring to FIG. 18, the display device 10 may detect the coupling capacitance CNC between the plurality of gate lines GL and the plurality of sensing electrodes RE in a second mode. Herein, the second mode may be a coupling-noise sensing mode of the display device 10.

The common electrode CAT may be grounded to a certain predetermined voltage or the earth in the second mode. The grounded common electrode CAT is disposed between the gate lines GL and the touch sensing unit TSU, thereby reducing or preventing the coupling capacitance CNC between the gate lines GL and the sensing electrodes RE.

For example, the film quality of a portion of the common electrode CAT may be degraded. For example, the film quality of the common electrode CAT may be degraded if the thickness of the common electrode CAT is reduced, the density thereof is decreased, or the area where the film is formed is reduced. If the film quality of the common electrode CAT is degraded, the common electrode CAT may not reduce the coupling capacitance CNC between the display unit DU and the touch sensing unit TSU. Accordingly, the coupling capacitance CNC between the display unit DU and the touch sensing unit TSU may be relatively large at some points of the common electrode CAT if the film quality is degraded. As shown in the embodiment of FIG. 18, when a first coupling capacitance CNC1 between the first gate line GL1 and the $n^{th}$ sensing electrode RE[n] is relatively large, the display device 10 may determine that the film quality of that portion of the common electrode CAT disposed between the first gate line GL1 and the $n^{th}$ sensing electrode RE[n] is degraded. In addition, when a second coupling capacitance CNC2 between the first gate line GL1 and the $(n-1)^{th}$ sensing electrode RE[n-type1] is relatively large, the display device 10 may determine that the film quality of that portion of the common electrode CAT disposed between the first gate line GL1 and the $(n-1)^{th}$ sensing electrode RE[n-1] is degraded.

As a result, the display device 10 may determine that the film quality of the common electrode CAT of FIG. 18 is degraded in more portions of the common electrode CAT than in the embodiment of FIG. 17.

Figure 19:
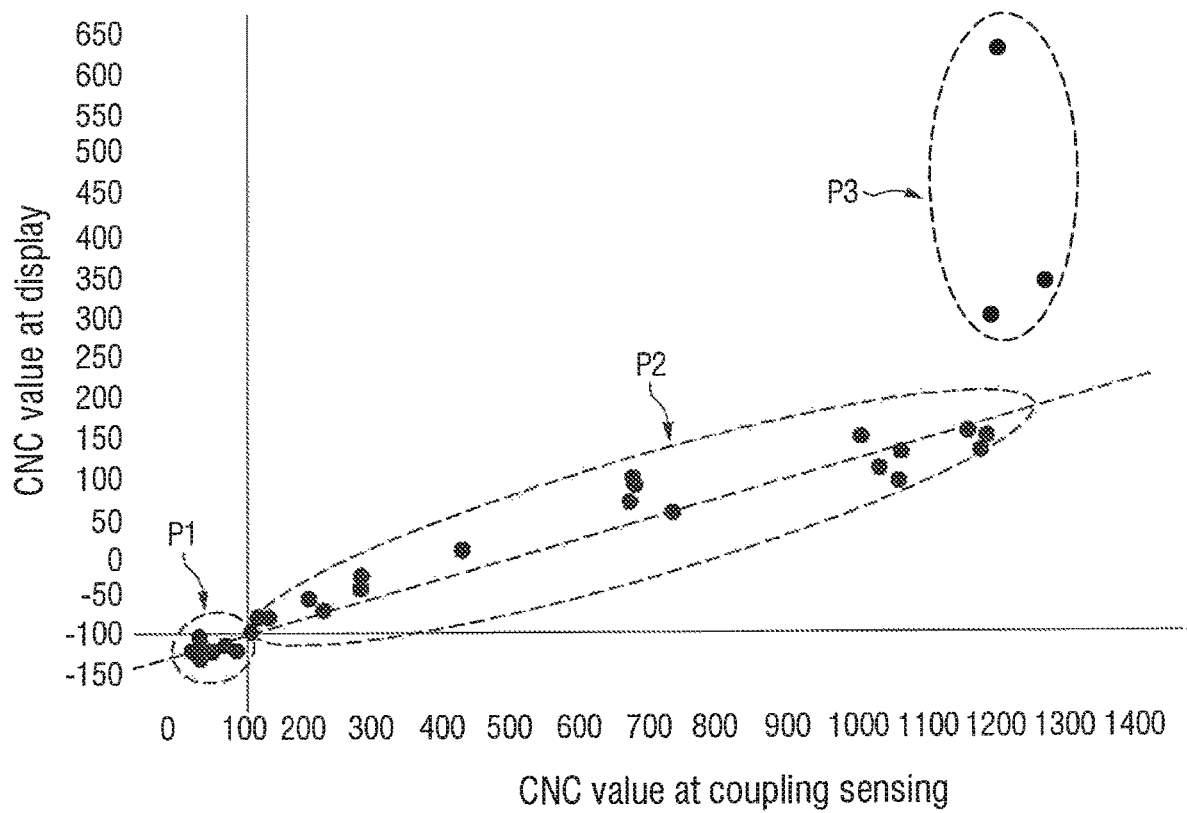
FIG. 19 is a graph for comparing noise capacitances between a first mode and a second mode at a number of points in a display device according to an embodiment of the present inventive concepts.
Figure 20:
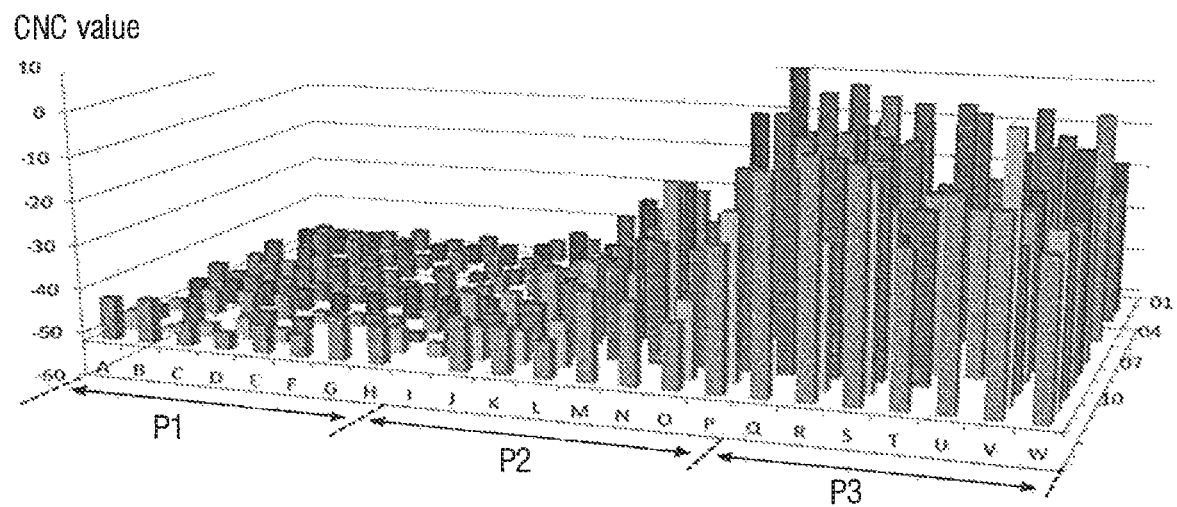
FIG. 20 is a graph for comparing noise capacitances at a number of points in a display device according to an embodiment of the present inventive concepts.

FIG. 19 is a graph for comparing noise capacitances between a first mode and a second mode at a number of points in a display device according to an embodiment. FIG. 20 is a graph for comparing noise capacitances at a number of points in a display device according to an embodiment. In the embodiments of FIGS. 19 and 20, the first points P1 represent the common electrode CAT with a high film quality shown in FIG. 8, the second points P2 represent the common electrode CAT with a degraded film quality shown in the embodiment of FIG. 17, and the third points P3 represent the common electrode CAT with further degraded film quality shown in the embodiment of FIG. 18.

Referring to the embodiments of FIGS. 19 and 20, the display device 10 may detect the coupling capacitance (e.g., the Y value labeled CNC value at display) between the display unit DU and the touch sensing unit TSU in the first mode (e.g., the display mode). The display device 10 may detect the coupling capacitance (e.g., the X value labeled CNC value at coupling sensing) between the display unit DU and the touch sensing unit TSU in the second mode (e.g., the coupling-noise sensing mode).

As shown in the embodiments of FIG. 19-20, the coupling capacitances (e.g., CNC values) associated with the first points P1 of the common electrode CAT may be relatively low. Accordingly, display device 10 may determine that the film quality of the first points P1 of the common electrode CAT may be relatively high.

The coupling capacitances (e.g., CNC values) associated with the second points P2 of the common electrode CAT may be relatively high. The coupling capacitances (CNC values) associated with the second points P2 of the common electrode CAT may be greater than the coupling capacitances (e.g., CNC values) associated with the first points P1 and smaller than the coupling capacitances (e.g., CNC values) associated with the third points P3. Accordingly, the display device 10 may determine that the film quality of the second points P2 of the common electrode CAT is moderately degraded.

The coupling capacitances (e.g., CNC values) associated with the third points P3 of the common electrode CAT may be relatively very high. The coupling capacitances (e.g., CNC values) associated with the third points P3 of the common electrode CAT may be greater than the coupling capacitances (e.g., CNC values) associated with the second points P2. Accordingly, the display device 10 may determine that the film quality of the third points P3 of the common electrode CAT is very degraded.

In conclusion, by comparing the coupling capacitances (e.g., CNC values) at different positions between the display unit DU and the touch sensing unit TSU of the display device 10, the display device 10 may determine the degradation degree of the quality of the common electrode CAT and the driving voltage line VDDL at the different positions and the degradation degree of the quality of the common electrode CAT and the driving voltage line VDDL can be quantified.

What is claimed is:

1. A display device comprising:
   a plurality of pixels;
   a gate line extending in a first direction and connected to each of the plurality of pixels;
   a common electrode disposed above the gate line and extending across the plurality of pixels;
   a touch sensing unit disposed above the common electrode and comprising a plurality of driving electrodes and a plurality of sensing electrodes;
   a display driver configured to drive the plurality of pixels;
   a first fan-out line connected to the display driver;
   a touch driver configured to drive the plurality of driving electrodes and the plurality of sensing electrodes;
   a second fan-out line connected to the touch driver; and
   a first switching element configured to selectively connect one of the first fan-out line and the second fan-out line to the gate line.

2. The display device of claim 1, wherein the common electrode receives a low-level voltage if the first fan-out line is connected to the gate line, and the common electrode is grounded to a predetermined voltage or earth if the second fan-out line is connected to the gate line.

3. The display device of claim 1, further comprising:
   a driving voltage line disposed above the gate line and connected to the plurality of pixels, the driving voltage line extends in a second direction crossing the first direction,
   wherein the driving voltage line receives a driving voltage if the first fan-out line is connected to the gate line, and the driving voltage line is grounded to a predetermined voltage or earth if the second fan-out line is connected to the gate line.

4. The display device of claim 1, further comprising:
   a data line connected to the plurality of pixels, the data line extends in a second direction crossing the first direction; and
   a second switching element configured to selectively connect one of the first fan-out line and the second fan-out line to the data line.

5. The display device of claim 4, further comprising:
   a driving voltage line disposed above the data line and connected to the plurality of pixels, the driving voltage line extends in the second direction,
   wherein the driving voltage line receives a driving voltage if the first fan-out line is connected to the data line, and the driving voltage line is grounded to a predetermined voltage or earth if the second fan-out line is connected to the data line.

6. The display device of claim 1, wherein:
   the touch sensing unit further comprises a plurality of driving lines connected to the plurality of driving electrodes, and a plurality of sensing lines connected to the plurality of sensing electrodes, and
   wherein the display device further comprises:
   first touch pads connecting the plurality of driving lines with the touch driver;
   second touch pads connecting the plurality of sensing lines with the touch driver; and
   third touch pads connecting the second fan-out line with the touch driver.

7. The display device of claim 1, wherein:
   the display driver supplies a gate signal to the gate line through the first fan-out line in a first mode; and
   the touch driver supplies a touch driving signal to the plurality of driving electrodes in the first mode to receive a touch sensing signal from the plurality of sensing electrodes.

8. The display device of claim 1, wherein the touch driver supplies a touch driving signal to the gate line through the second fan-out line in a second mode to receive a touch sensing signal from the plurality of sensing electrodes.

9. The display device of claim 1, wherein:
   the display driver supplies a source signal to the gate line through the first fan-out line in a third mode; and
   the touch driver supplies a touch driving signal to the plurality of driving electrodes in the third mode to receive a touch sensing signal from the plurality of sensing electrodes.

10. The display device of claim 9, wherein the source signal is at least one signal selected from a sine wave signal, a square wave signal, a pulse signal, a ramp wave signal, and a Gaussian noise signal.

11. The display device of claim 1, wherein the touch sensing unit further comprises a noise sensing line extending along borders of the plurality of driving electrodes and the plurality of sensing electrodes.

12. The display device of claim 11, wherein the touch driver supplies a touch driving signal to the gate line through the second fan-out line in a second mode to receive a touch sensing signal from the noise sensing line.

13. The display device of claim 1, further comprising a control unit configured to supply a mode control signal to the first switching element to selectively connect the first switching element with one of the first fan-out line and the second fan-out line.

14. The display device of claim 13, wherein the control unit receives a coupling capacitance between the gate line and the sensing electrode from the touch driver in a second mode and generates noise compensation data based on the coupling capacitance.

15. A display device comprising:
a plurality of pixels;
a gate line extending in a first direction and connected to each of the plurality of pixels;
a common electrode disposed above the gate line and extending across the plurality of pixels;
a touch sensing unit disposed above the common electrode and comprising a plurality of driving electrodes and a plurality of sensing electrodes;
a display driver configured to drive the plurality of pixels; and
a touch driver configured to drive the plurality of driving electrodes and the plurality of sensing electrodes,
wherein the display driver comprises a first switching element configured to selectively connect one of a first lead line connected to a first pad and a second lead line connected to a second pad to the gate line.

16. The display device of claim 15, wherein the display driver receives a data voltage or a gate control signal through the first lead line, and the display driver receives a touch driving signal through the second lead line.

17. The display device of claim 15, wherein the common electrode receives a low-level voltage if the first lead line is connected to the gate line, and the common electrode is grounded to a predetermined voltage or earth if the second lead line is connected to the gate line.

18. The display device of claim 15, further comprising:
a driving voltage line disposed above the gate line and connected to the plurality of pixels, the driving voltage line extends in a second direction crossing the first direction,
wherein the driving voltage line receives a driving voltage if the first lead line is connected to the gate line, and the driving voltage line is grounded to a predetermined voltage or earth if the second lead line is connected to the gate line.

19. The display device of claim 15, further comprising:
a data line connected to the plurality of pixels, the data line extends in a second direction crossing the first direction and; and
a second switching element configured to selectively connect one of the first lead line and the second lead line to the data line.

20. The display device of claim 19, further comprising:
a driving voltage line disposed above the data line and connected to the plurality of pixels, the driving voltage line extends in the second direction,
wherein the driving voltage line receives a driving voltage if the first lead line is connected to the data line, and the driving voltage line is grounded to a predetermined voltage or earth if the second lead line is connected to the data line.

21. A display device comprising:
a display unit having a plurality of pixels, each of the plurality of pixels having a gate line and a data line connected thereto;
a touch sensing unit having a plurality of sensing electrodes;
a display driver configured to drive the plurality of pixels; and
a touch driver configured to supply a driving signal to the gate line or the data line to receive a touch sensing signal from the plurality of sensing electrodes,
wherein the touch driver is configured to compare a coupling capacitance between the display unit and the touch sensing unit at different positions.

* * * * *